No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 1.

Witnesses:
Oscar F. Hill
Arthur G. Randall

Inventor:
Joseph French
by Macleod Calver Randall
Attorneys.

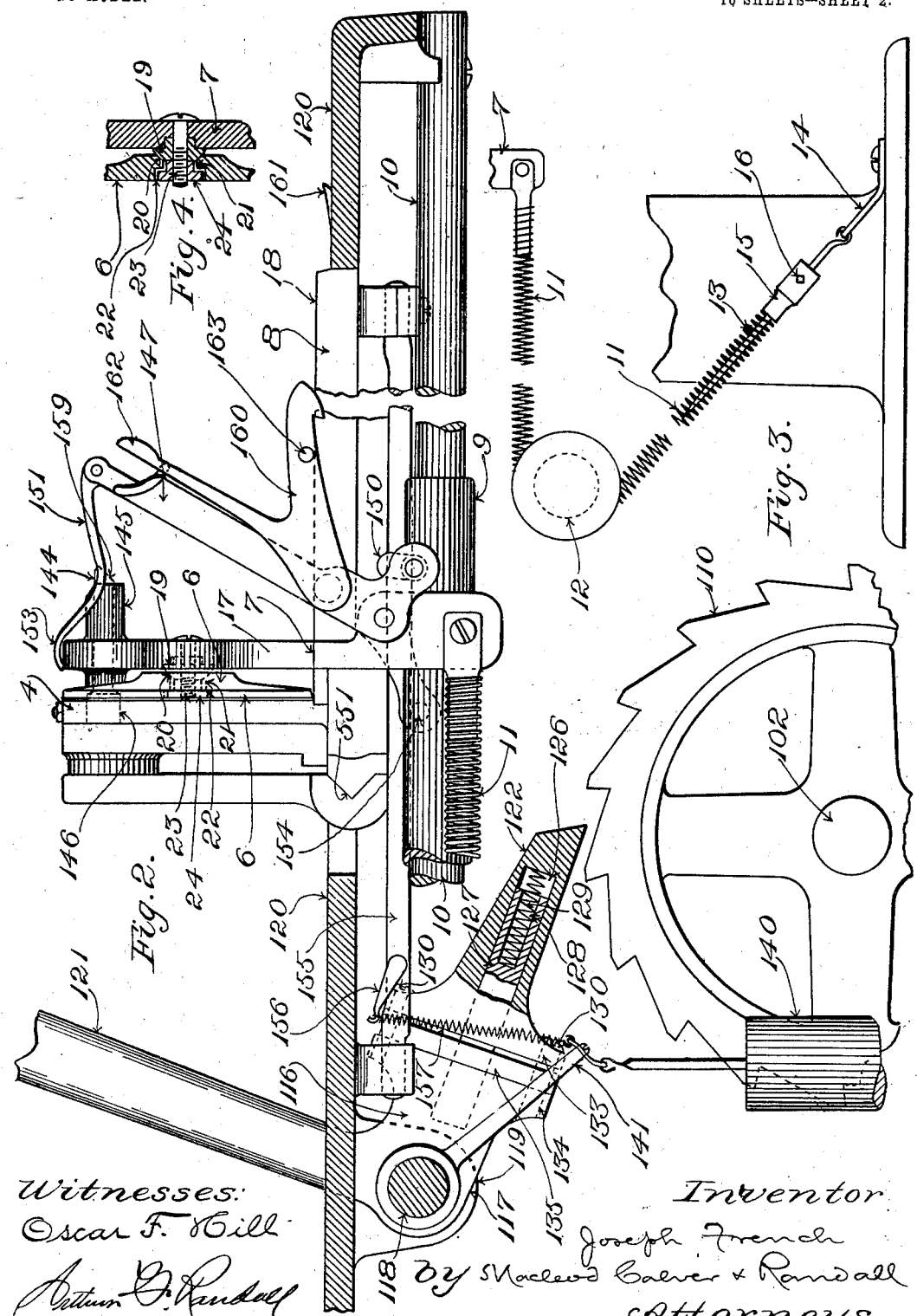

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 3.

Witnesses:
Oscar F. Hill
Arthur D. Randall

Inventor:
Joseph French
by Macleod Calver & Randall
Attorneys.

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 5.

Witnesses:
Oscar F. Hill
Arthur D. Randall

Inventor:
Joseph French
by Macleod Calver Randall
Attorneys.

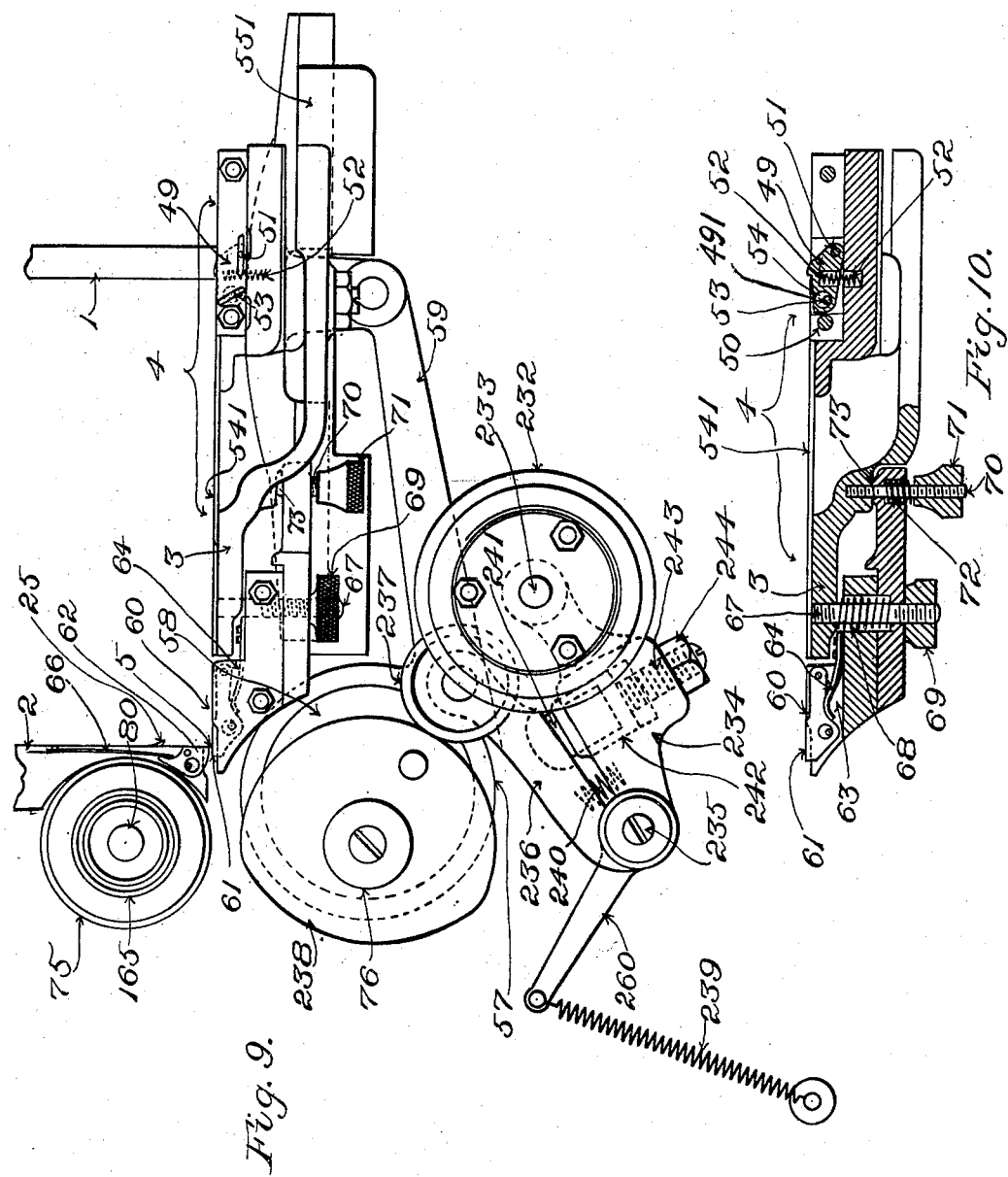

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 7.

Witnesses:
Oscar F. Hill
Arthur D. Randall

Inventor:
Joseph French
by Macleod Calver & Randall
Attorneys.

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 12.
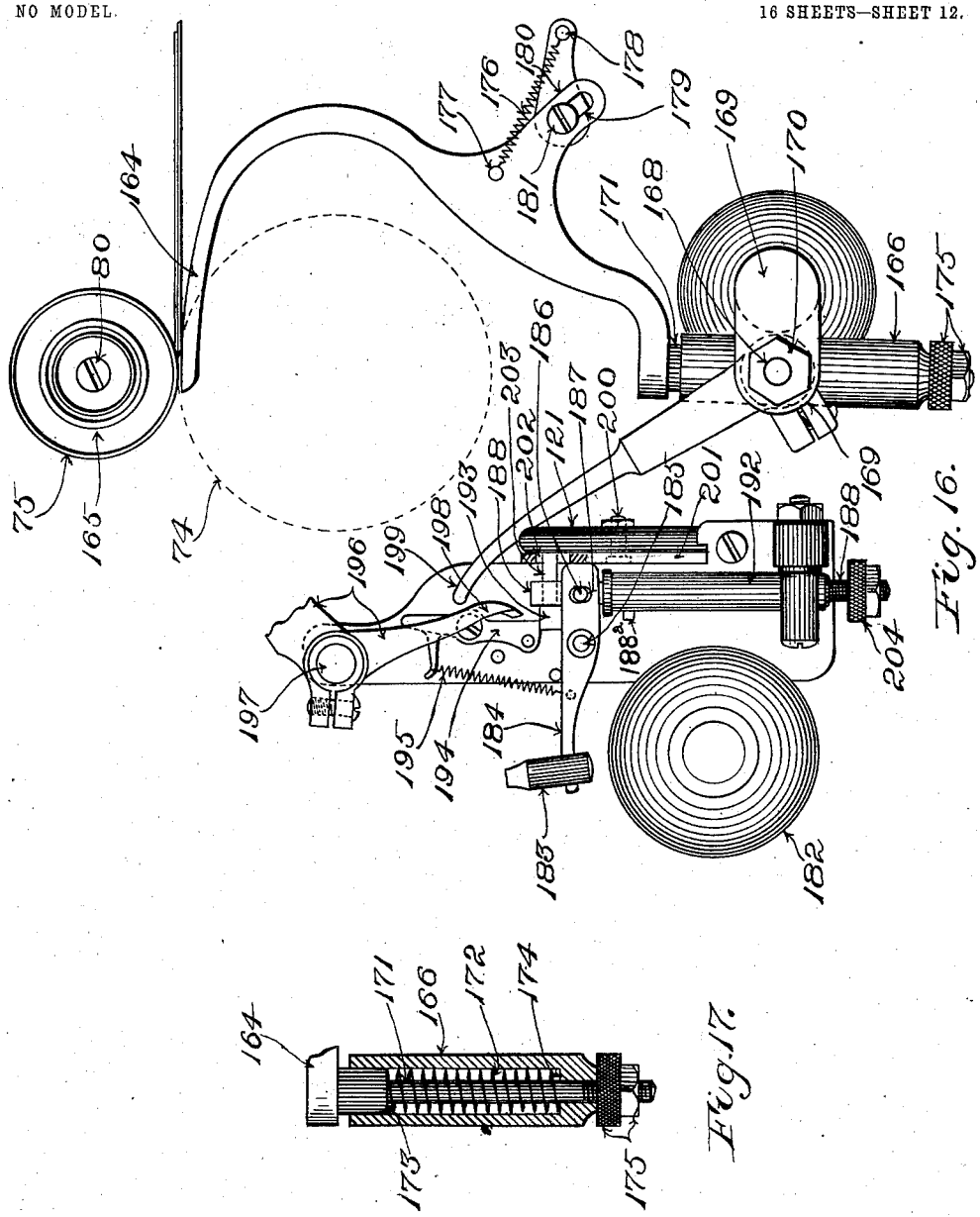

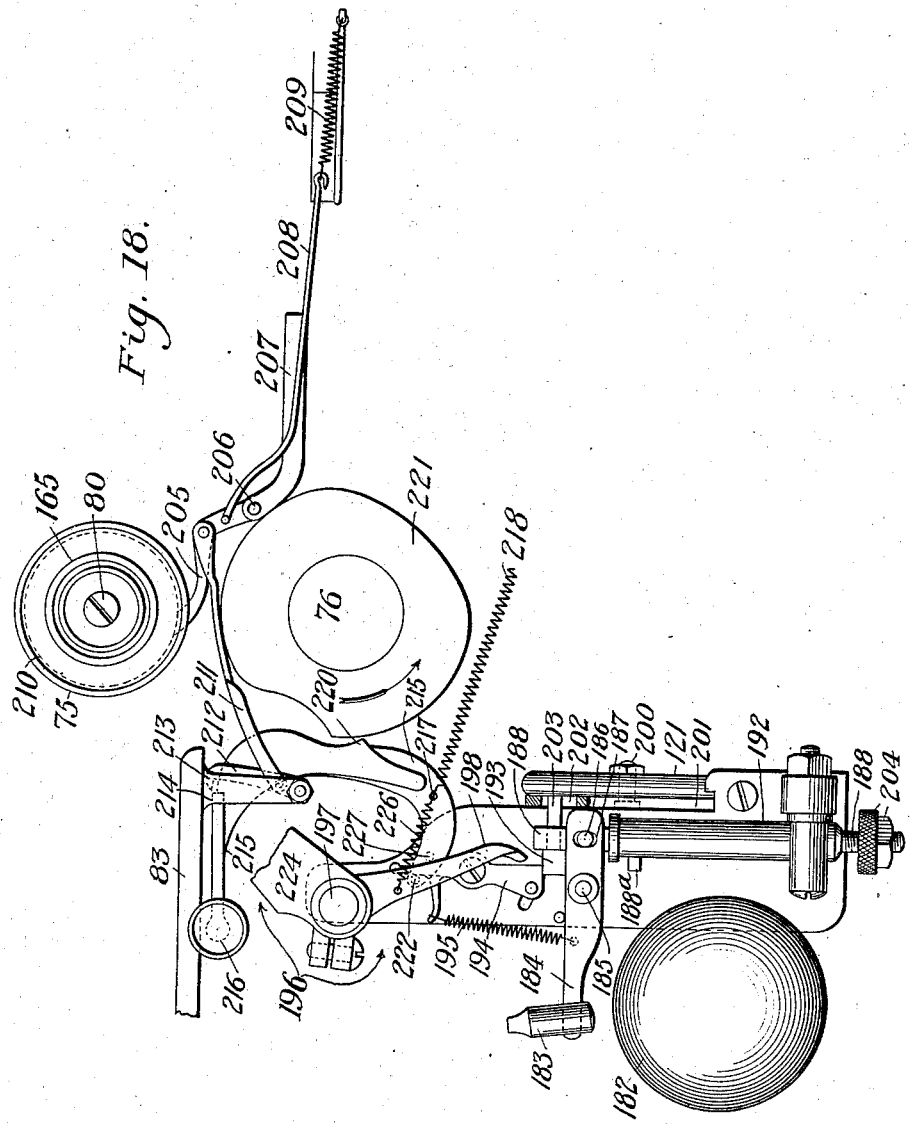

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 14.

Witnesses: Inventor:
Oscar F. Hill Joseph French
Arthur G. Randall by Macleod Calver Randall
Attorneys.

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 15.
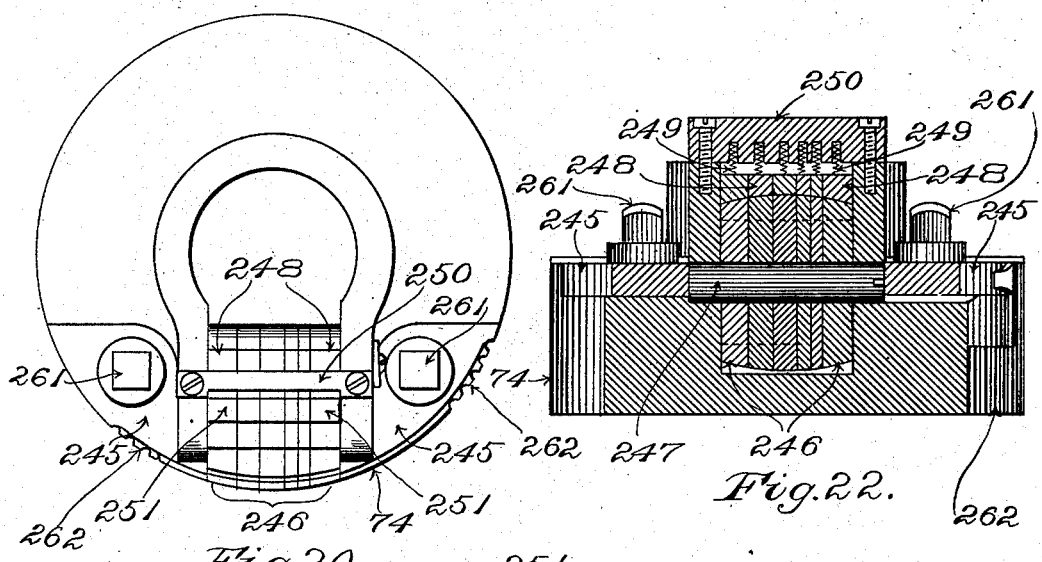
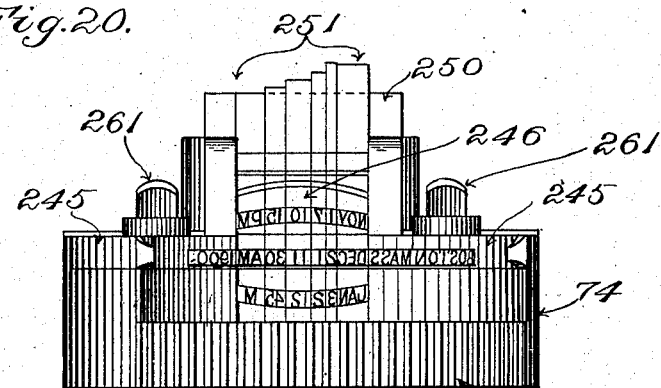
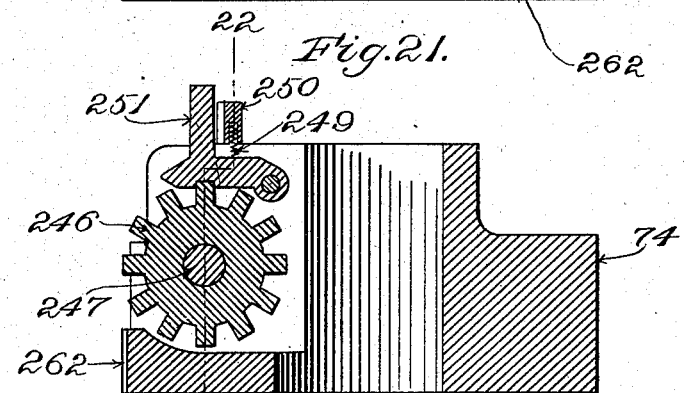
Witnesses:
Oscar F. Hill
Arthur J. Randall
Inventor.
Joseph French
by Macleod Calver Randall
Attorneys.

No. 741,902. PATENTED OCT. 20, 1903.
J. FRENCH.
POSTMARKING AND CANCELING MACHINE.
APPLICATION FILED JAN. 23, 1901.
NO MODEL. 16 SHEETS—SHEET 16.
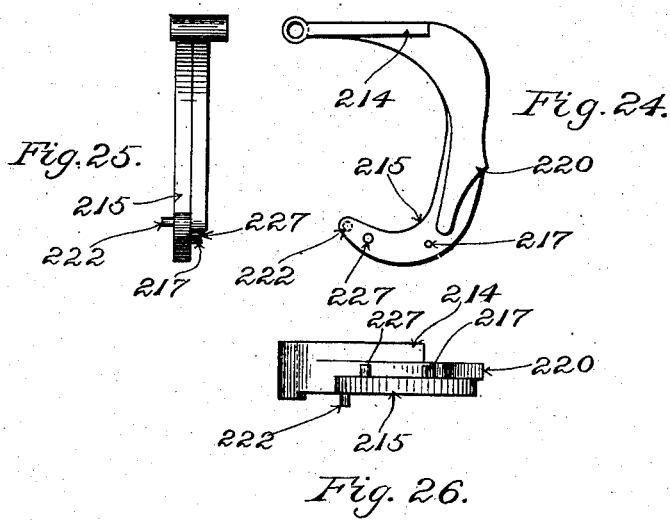
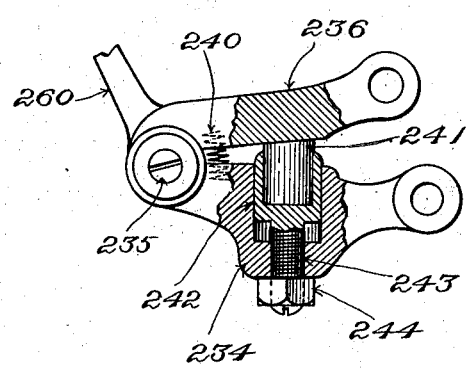
Fig. 27.
Witnesses:
Oscar F. Hill
Inventor:
Joseph French
By S Macleod Calvert Randall
Attorneys.

No. 741,902. Patented October 20, 1903.

UNITED STATES PATENT OFFICE.

JOSEPH FRENCH, OF WOONSOCKET, RHODE ISLAND.

POSTMARKING AND CANCELING MACHINE.

SPECIFICATION forming part of Letters Patent No. 741,902, dated October 20, 1903.

Application filed January 23, 1901. Serial No. 44,490. (No model.)

*To all whom it may concern:*

Be it known that I, JOSEPH FRENCH, a citizen of the United States, residing at Woonsocket, in the county of Providence, State of Rhode Island, have invented a certain new and useful Improvement in Postmarking and Canceling Machines, of which the following is a specification, reference being had therein to the accompanying drawings.

The invention consists in an improved machine which has been devised more especially for use for postmarking and canceling purposes in connection with cards and the like or for printing upon the same, many features thereof being adapted for use in connection with letters.

Figure 1:
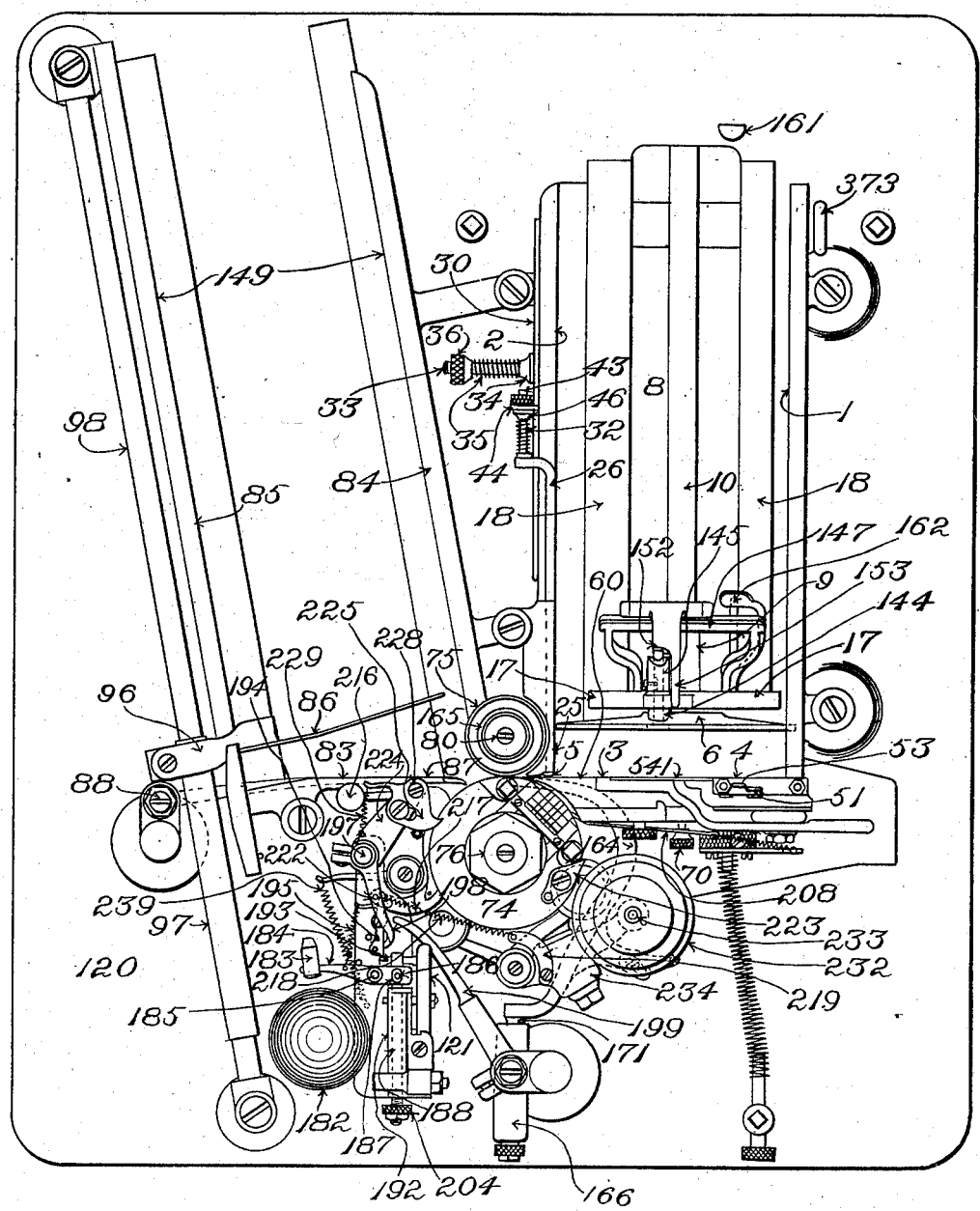
Figures 5, 6:
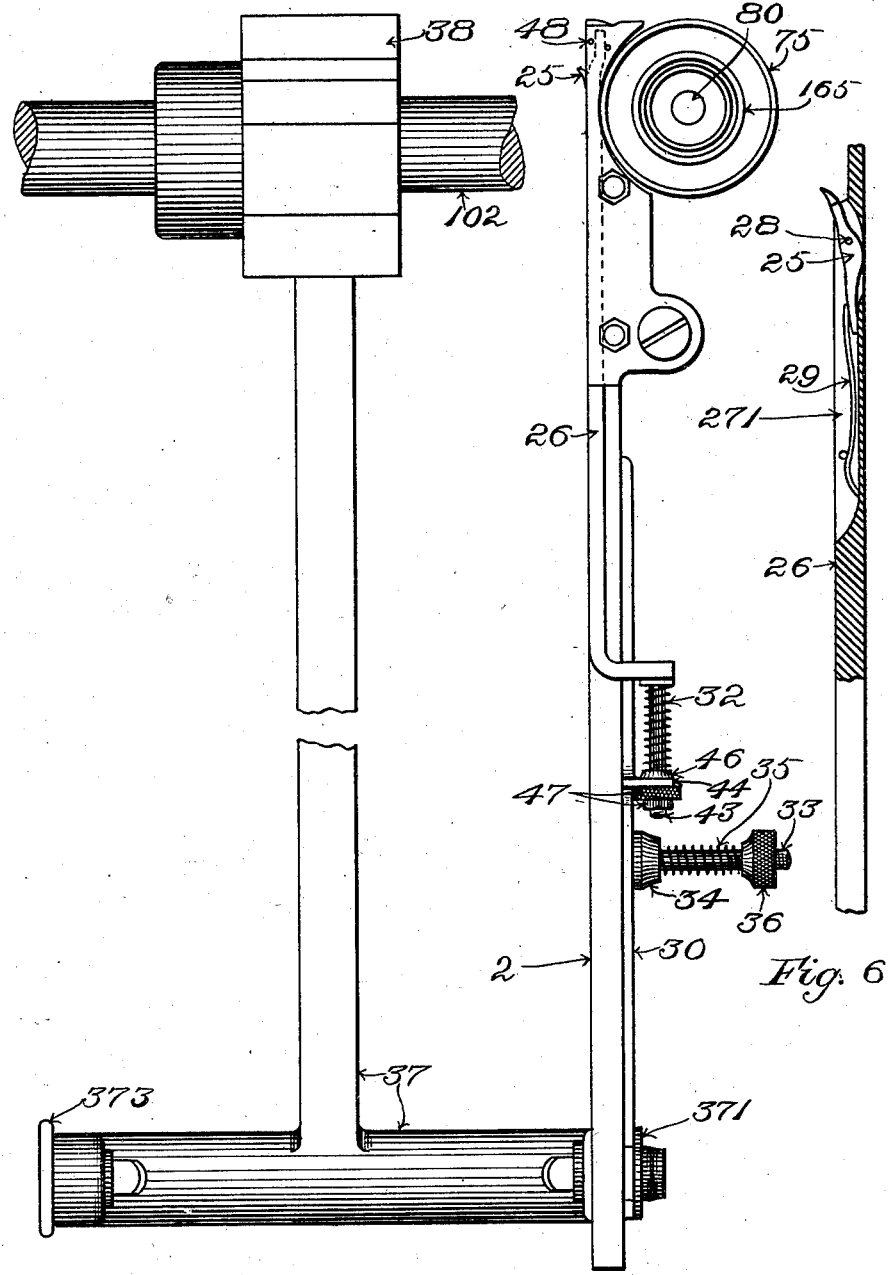
Figure 7:
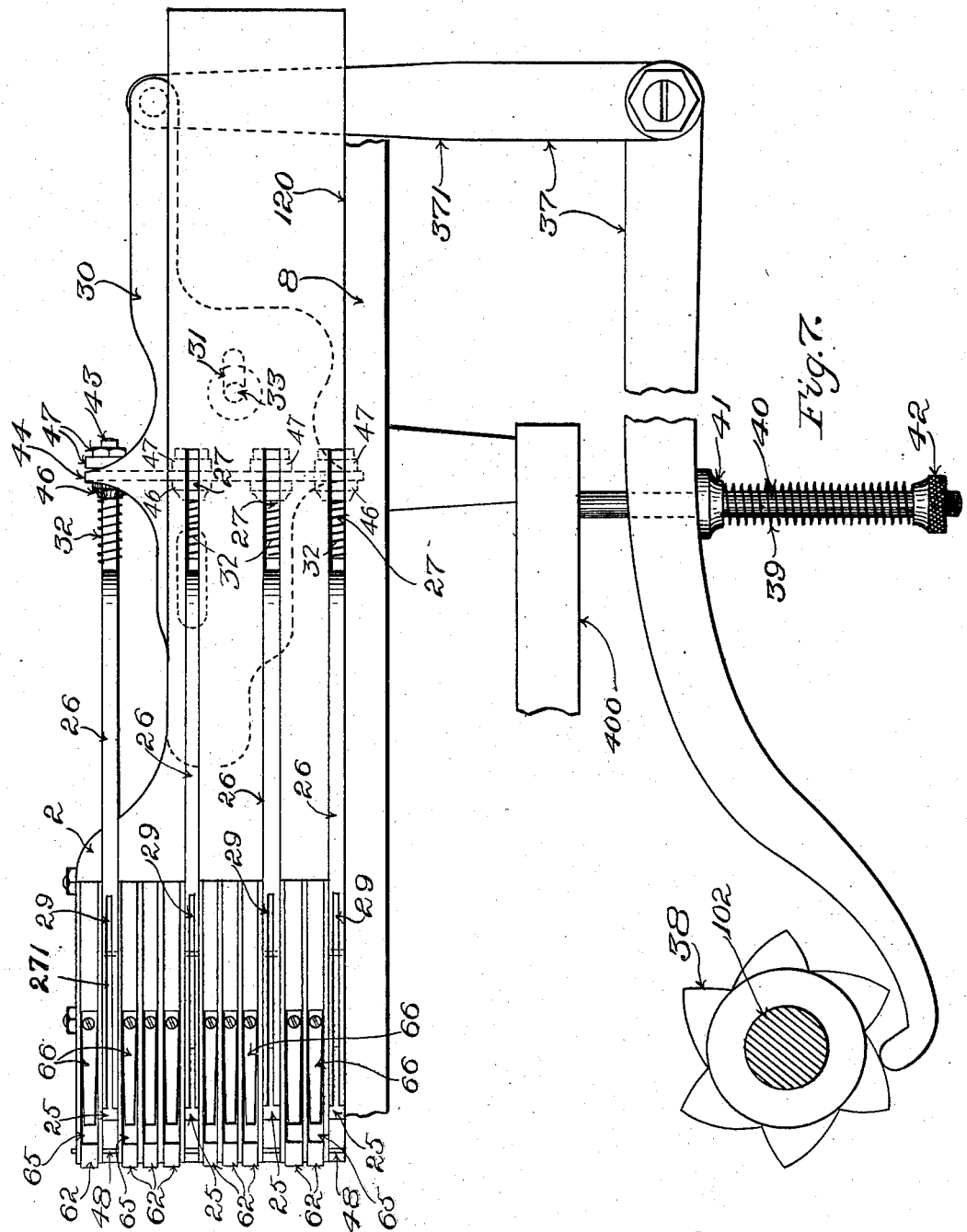
Figure 8:
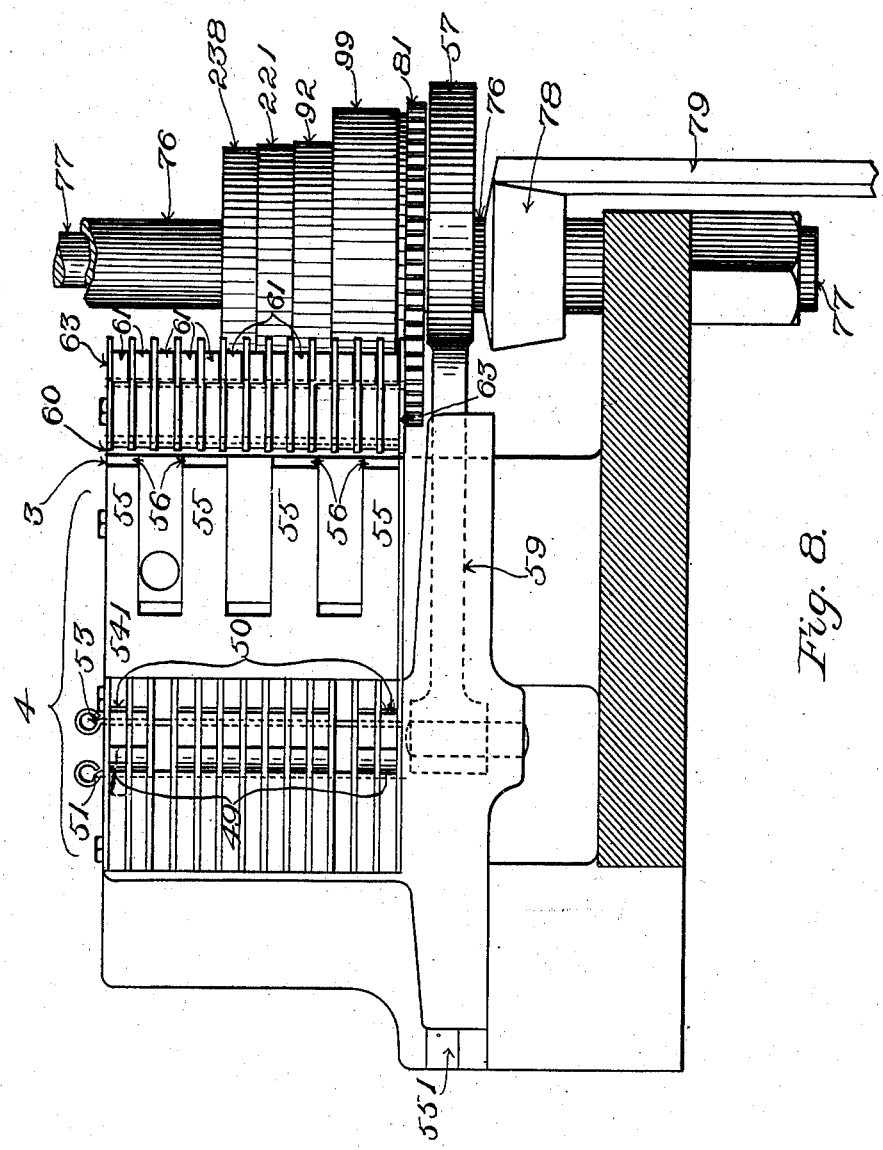
Figure 11:
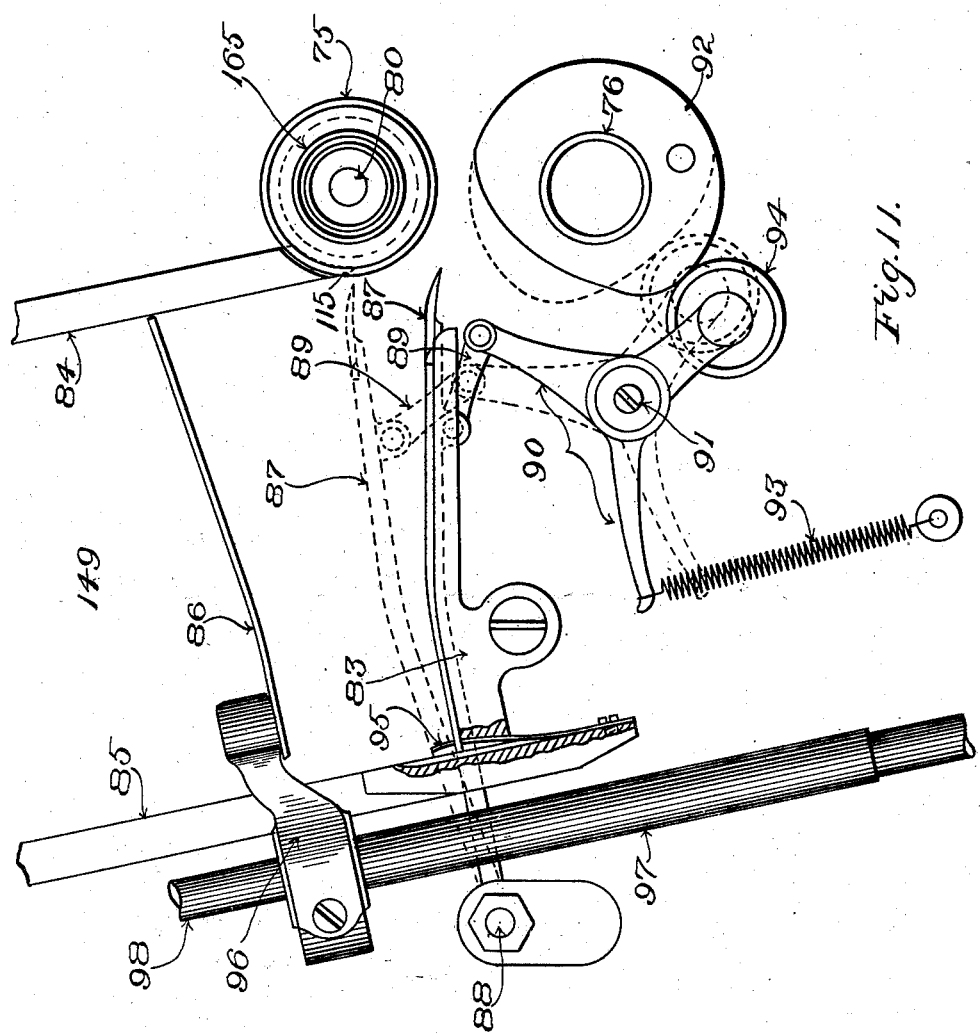
Figure 12:
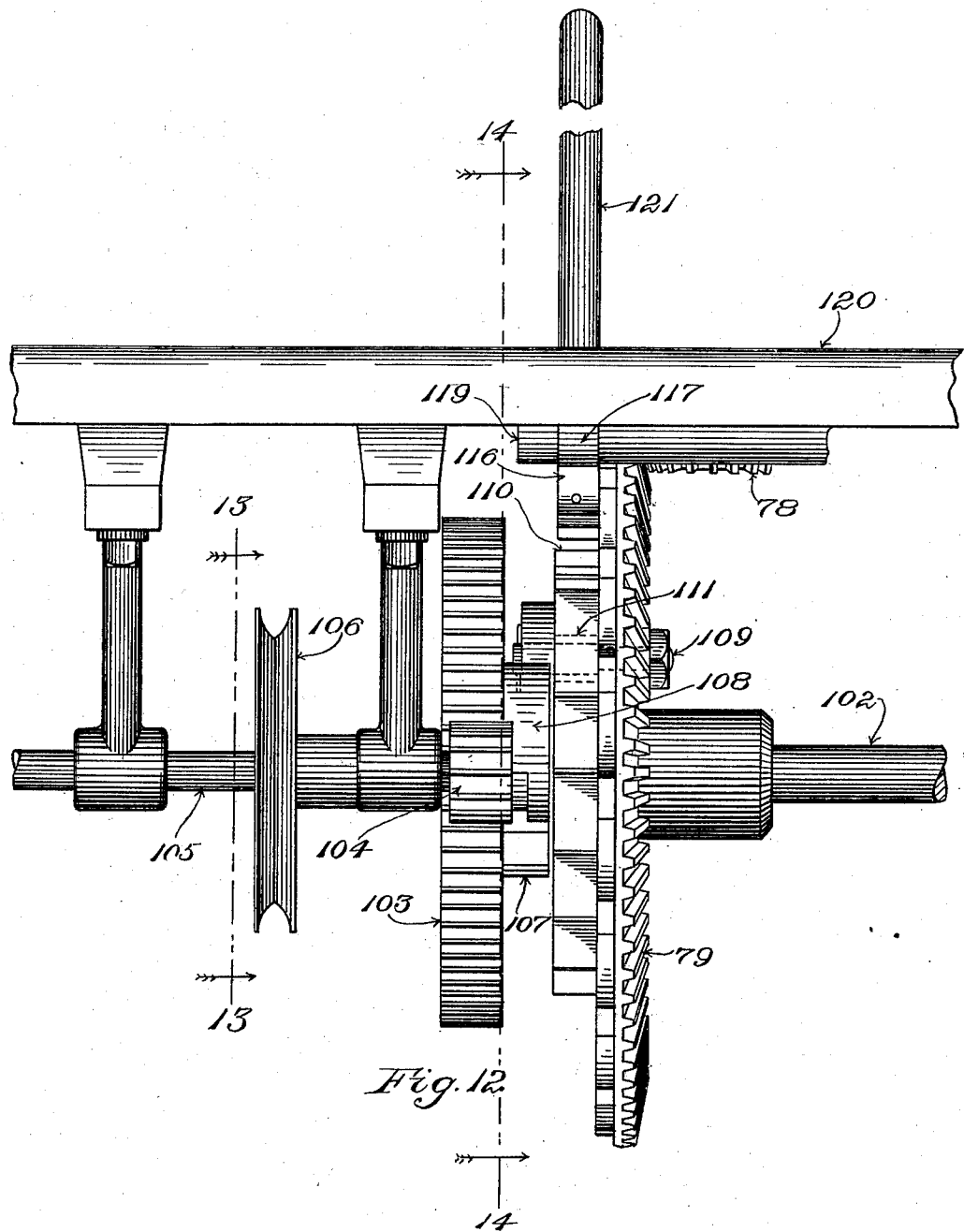
Figure 13:
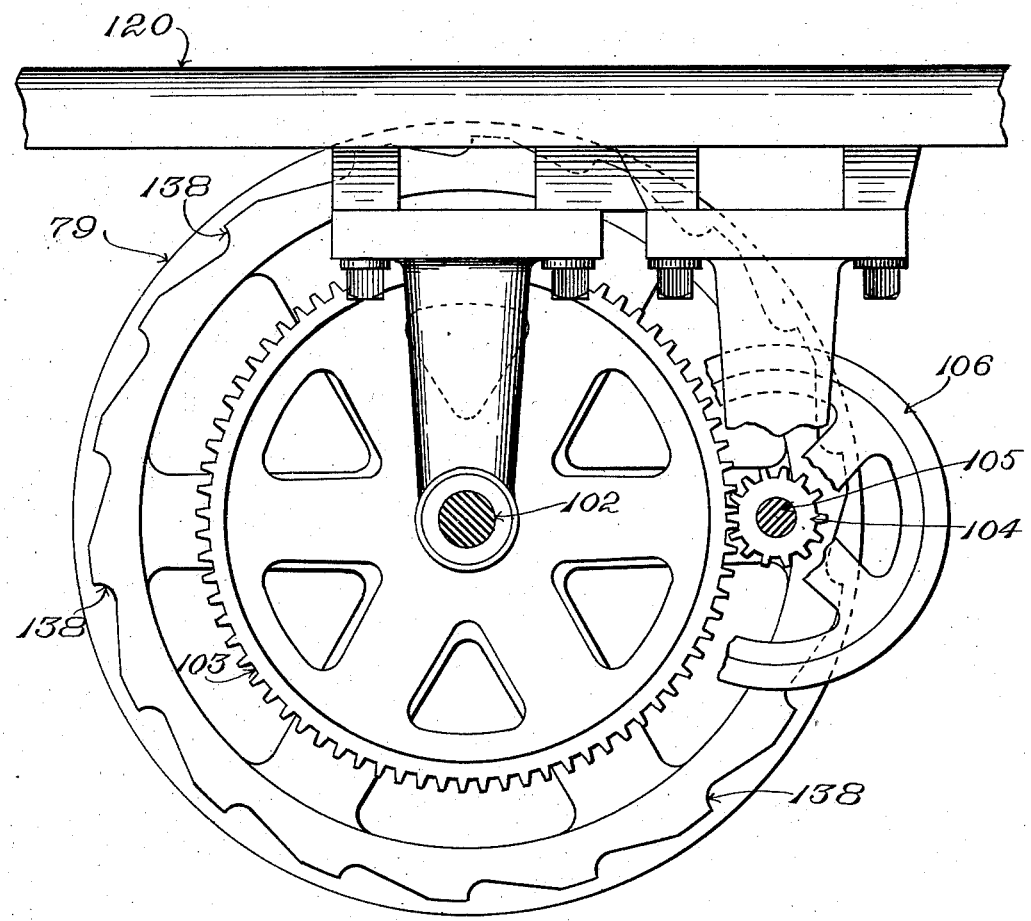
Figure 14:
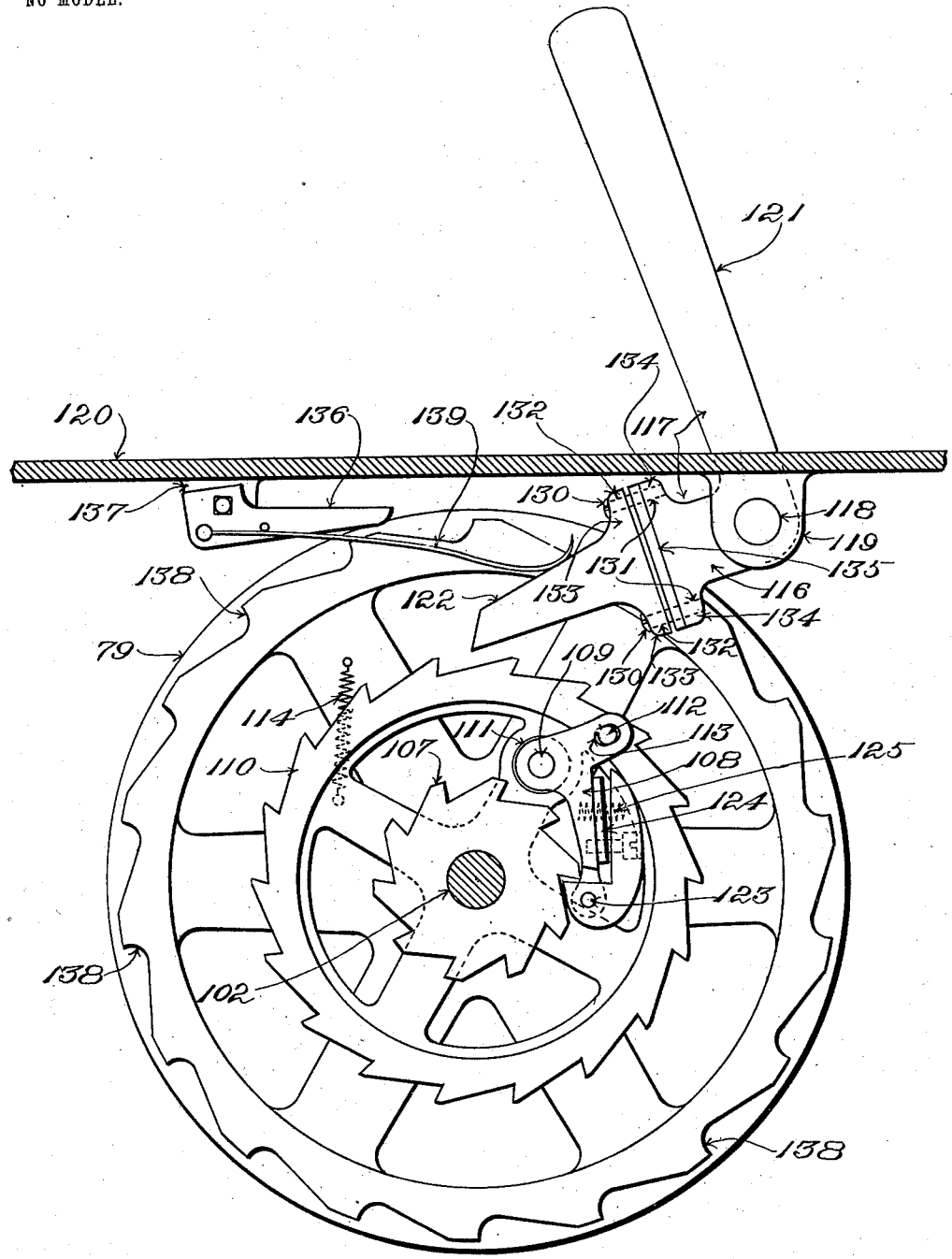
Figure 15:
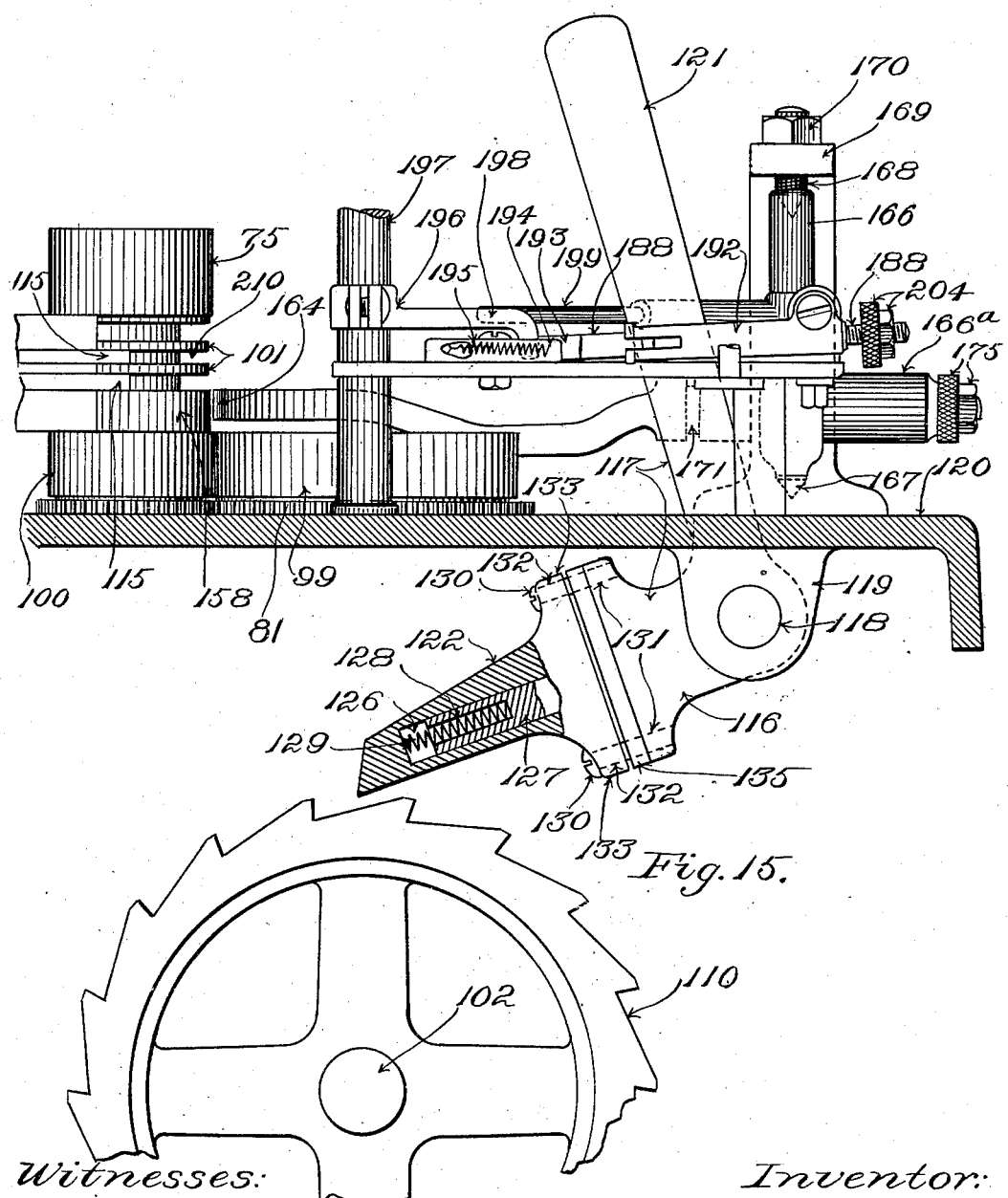
Figure 19:
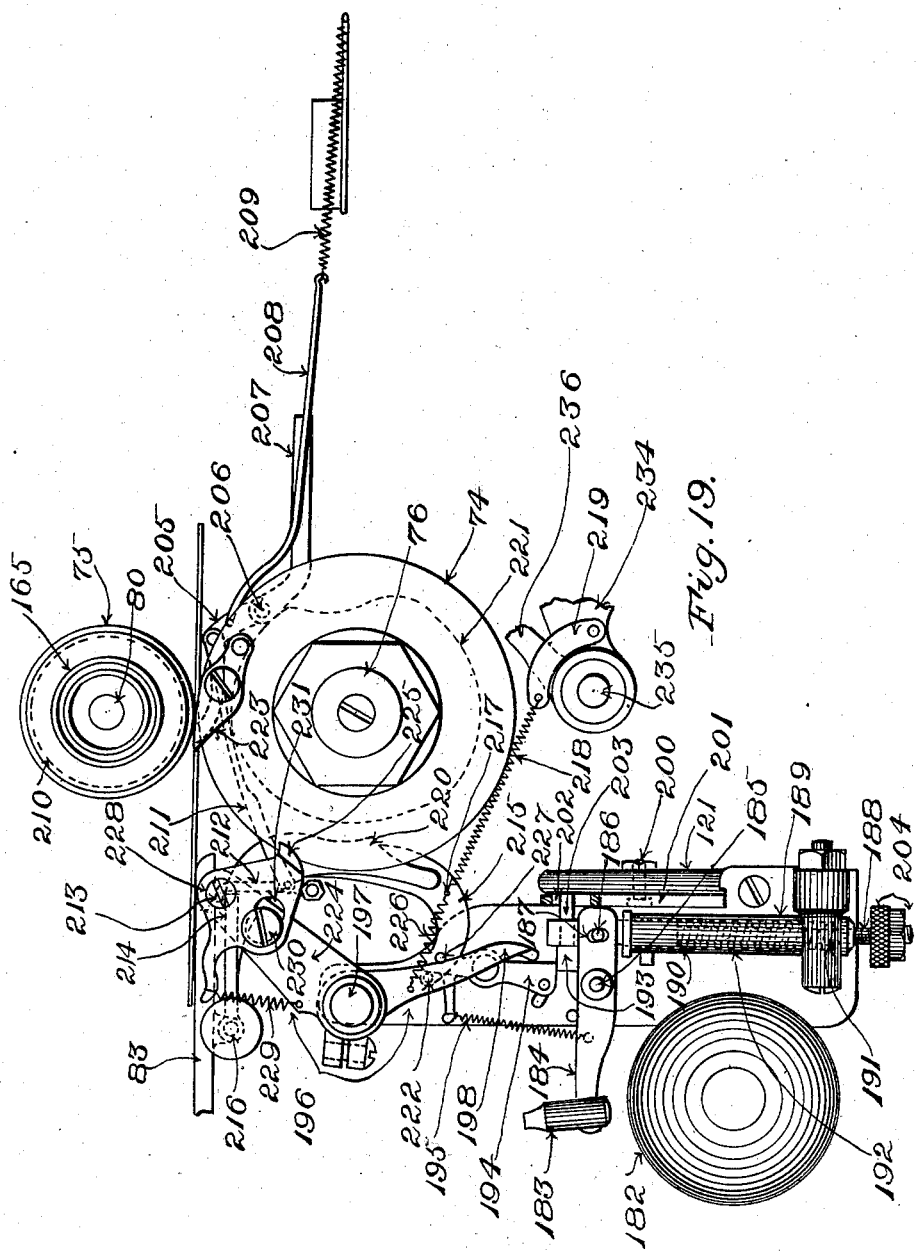

Having reference to the drawings, Figure 1 shows in plan a machine embodying my present invention. Fig. 2, Sheet 2, is a partly-sectional view, looking from the right-hand side in Fig. 1, on an enlarged scale. Fig. 3, Sheet 2, is a detail view in side elevation, on a small scale, showing chiefly the means of propelling the follower within the feed-receptacle. Fig. 4, Sheet 2, is a sectional detail view of portions of the follower that is located within the feed-receptacle. Fig. 5, Sheet 3, shows in plan the backing-roll, one side of the feed-receptacle, and the devices for acting upon the edges of a stack of cards within the feed-receptacle. Fig. 6, Sheet 3, is a view in horizontal section, on an enlarged scale, of one of the bars 26 and the parts carried thereby. Fig. 7, Sheet 4, shows in elevation most of the parts of Fig. 5. Fig. 8, Sheet 5, shows certain parts which are located at and adjacent the inner end of the feed-receptacle. Fig. 9, Sheet 6, shows in plan the inner end of a feed-receptacle and a number of parts that are adjacent thereto, the printing-roll being omitted in order to show parts that would be hidden thereby. Fig. 10, Sheet 6, is a view showing in horizontal section the end plate of the feed-receptacle and the feeder. Fig. 11, Sheet 7, is a plan of the inner end of the receptacle for receiving the cards after they have passed the printing devices, the follower within said receptacle, and certain parts which are located at and adjacent said end. Fig. 12, Sheet 8, shows in elevation the driving mechanism. Fig. 13, Sheet 9, is a section on line 13 13, Fig. 12, looking in the direction that is indicated by the arrows adjacent the ends of such line. Fig. 14, Sheet 10, is a section on line 14 14, Fig. 12, looking in the direction that is indicated by the arrows at the ends of such line. Fig. 15, Sheet 11, is a partly-sectional side elevation chiefly designed to show certain features of the detector, alarm, and stopping mechanism. Fig. 16, Sheet 12, is a plan view showing chiefly the two-card detector mechanism and the alarm and stopping mechanism. Fig. 17, Sheet 12, is a sectional detail. Fig. 18, Sheet 13, is a plan view showing chiefly the misfed detector mechanism, the alarm, and stopping mechanism. Fig. 19, Sheet 14, is a plan view showing the features of Fig. 18 and in addition the detector mechanism operating on failure of a card to discharge from the printing devices. Fig. 20, Sheet 15, shows the printing-roll in plan. Fig. 21, Sheet 15, shows the said roll in side elevation. Fig. 22, Sheet 15, shows the said roll in transverse section on the vertical plane indicated by line 22 22, Fig. 23. Fig. 23, Sheet 15, shows the said roll in vertical section on a plane at right angles to Fig. 22. Fig. 24, Sheet 16, shows the rocker 215 in plan, detached. Fig. 25, Sheet 16, shows the said rocker in edge elevation. Fig. 26, Sheet 16, shows the said rocker in end elevation. Fig. 27, Sheet 17, is a partly-sectional detail view of the inking arrangements.

The receptacle for the stack of cards or other articles to be postmarked and canceled or printed comprises the opposite parallel sides 1 2, Fig. 1, and the end piece 3. The sides 1 2 are spaced apart at a distance corresponding with the length of the cards or other articles to be received within the same. At the inner end of the said receptacle (see Figs. 1, 2, 8, 9) is located the reciprocatory feeder 4, by means of which the cards or other articles are pushed successively part way through the throat or passage-way 5, Figs. 1 and 9, at one side of the delivery end of the said receptacle.

Within the supply-receptacle is placed the follower 6, Figs. 1 and 2, by means of which the contents of the said receptacle are pressed toward the said delivery end. The follower is connected with the frame 7, Fig. 2, working in the slot 8, Figs. 1 and 2, formed in the table 120 of the machine and extending longitudinally of the latter, the said frame 7 (see Fig. 2) being furnished with a sleeve or tube 9, fitted and adapted to slide upon a guide-rod 10, located within or below the said slot in the table and secured at its opposite ends to suitable supports formed or provided on the table. For the purpose of moving the follower-frame 7 and follower 6 with yielding force toward the delivery end of the said supply-receptacle I connect with the follower-frame 7 a long spiral spring 11, Figs. 2 and 3, (Fig. 2 being on an enlarged scale, and Fig. 3 on a much smaller scale.) In order that said spring may act with substantially uniform stress at all times during the inward movement of the follower-frame and follower from the outer portion of the supply-receptacle toward the inner portion thereof—that is, without material difference in its tension—I employ a very long spring, the said spring extending from its point of attachment to the follower-frame 7, partly around a guide sheave or pulley 12, and down toward the base of the supporting-standard of the machine, the lower portion of the spring 11 receiving within it a rod 13, which is hooked at its lower end to a lug or plate 14, attached to the said base, the lower extremity of the spring 11 being made fast to a collar 15, which is adapted to be slid lengthwise upon the said rod and to be secured by means of a clamping-screw 16 at the desired point in the length of the said rod 13 to secure the requisite tension of the spring 11. For the purpose of securing easy movement of the sleeve or tube 9 upon the guide-rod 10 and obviating any tendency of the said sleeve or tube to cramp or bind in its movements I make the sleeve or tube 9 of considerable length, as shown.

For the purpose of steadying the follower-frame 7 and follower 6 I form the said follower-frame with opposite laterally-extending portions or arms 17 17, Figs. 1 and 2, which bear upon the finished surfaces 18 18 on the top of the table 120 at opposite sides of the slot 8. These finished surfaces 18 18 also support the cards, the lower edges of the latter sliding thereon as the stack of cards is pushed toward the delivery end of the supply-receptacle by the action of the follower 6.

It happens sometimes that the stack of cards or other articles occupying the supply-receptacle 148 will be thicker—i. e., will take up more space measured lengthwise of the said receptacle—at one side of the latter than at the other. With the object in view of securing uniform pressure against all parts of the stack notwithstanding variations in thickness like that just referred to I render the follower 6 self-adjusting upon the follower-frame 7 by loosely connecting it with the latter by means of a ball-and-socket joint, as shown.

The ball-and-socket connection is indicated in Figs. 2 and 4. In the said figures the convex part of the said joint is shown as constituted by the rounded periphery of a collar 19, the periphery of which constitutes a spherical section, the reduced or rabbeted base of the said collar being seated within a recess in one vertical face of the follower-frame 7, while the rim or flange of the collar lies against the said vertical face. This construction and arrangement steadies the collar. The follower 6 is formed with a partly-spherical concavity 20, Figs. 2 and 4, to receive the convex exterior of the said collar or washer, and also with a hole 21 through the same, which hole is rabbeted at 22 on the side opposite the said concavity. A holding-bolt 23 passes through a hole in the follower-frame and through the collar 19, it receiving upon its threaded end the T-washer or flanged nut 24, the flange of which occupies the rabbet 22 in the follower 6. This construction renders the follower 6 free to adjust itself in all directions—i. e., universally—upon the follower-frame to the extent required in practice.

The throat or passage-way 5 at one side of the delivery end of the supply-receptacle, as aforesaid, Figs. 1 and 9, and into which the leading end of the foremost card or other article of the stack contained in the supply-receptacle is pushed by the action of the feeder 4, is very narrow in order to guard as far as possible against the entrance of more than one card or the like into the said throat. The narrowness of the said throat which is requisite when handling cards would tend to interfere under certain conditions with the proper entrance of the leading end of a card into the same. For example, difficulty would arise in case the leading end of the card should have become battered, and thereby thickened or slightly bent, or in case of warping of the cards. Again, when a considerable number of cards is comprised in the stack contained within the supply-receptacle the heaviest pressure practicable to be applied and maintained in compressing the same through the action of the follower 6 sometimes is found insufficient to flatten the first card of the stack against the end plate of the receptacle, so that when it is moved transversely by the action of the feeder its leading end shall pass properly into the throat 5. In order to obviate this disadvantage and insure that the leading end of a card shall enter the throat 5 properly, I provide a series of dogs 25, Figs. 1, 5, 6, 7, and 9, which have their working ends arranged to act closely adjacent the throat 5. The said working ends are intended to engage in the operation of the machine with the vertical edges of the cards at a short distance from the throat 5. These dogs 25 are carried by a series of bars 26, placed one above another and working in horizontal slots 27, Fig. 7, extending in a direction lengthwise of the side plate 2 of the supply-receptacle. These bars 26 move longitudinally in unison, and the dogs 25 are movably mounted thereon, being projected by spring-pressure beyond the surface of the side plate into position to engage with end edges of the cards. Herein each dog 25 is fitted within a slot 271 in its carrying-bar 26, Fig. 6, it being connected with the said bar by means of a vertical pivot 28, and the tail of the dog is acted upon by a light spring 29, also contained within the said slot. For the purpose of actuating the bars 26 in unison I provide a slide 30, Figs. 1, 5, and 7, at the back or outer side of the side plate 2, the said slide having a longitudinal slot 31, Fig. 7, therein, through which passes the stem of a threaded stud or bolt 33, Figs. 1, 5, and 7, projecting outwardly from the side plate 2, the said slide being held against the outer side of the side plate 2 by means of a loose collar 34 on the stud or bolt, acted upon by a compression-spring 35, surrounding the said stud or bolt, the said spring being held under tension by means of the nut 36, applied to the threaded portion of the stud or bolt. For the actuation of the slide 30 automatically I provide convenient means, herein constituted by the rocker 37, Figs. 5 and 7, having the vertical arm 371 thereof connected with the slide 30, the cam 38 on the main shaft 102 of the machine acting on the horizontal arm of the rocker 37 and the spring 39 acting in opposition to the said cam. A threaded stud or bolt 40, Fig. 7, extending downward from a suitable fixed part 400, Fig. 7, of the frame of the machine, passes through a hole in the said rocker and receives the spring thereon below the latter, a collar 41 being interposed between the spring 39 and rocker 37 and the tension of the spring 39 being conveniently regulated by means of a nut 42 on the threaded part of the stud or bolt 40. The pivotal mounting of the dogs 25 upon the carrying-bars 26 enables them to recede into the slots 271 of the said bars as they ride past the end edges of the cards in the receding movements of the bars 26. In the advancing movement of the bars 26 the engaging ends of the dogs 25 catch behind the ends of the cards and push the said ends forward toward the far side of the throat 5. The force of the springs 29, which bear against the tails of the dogs 25 in the slots 271 of the said carrying-bars 26, is sufficient to cause the backs of the dogs 25 in the receding movement of the bars 26 to hold slightly to the edges of the cards and bend the same reversely—that is to say, away from the throat 5. This acts while such receding movement is taking place to lessen the pressure which is exercised against the first card—i. e., the one about to be fed through the throat 5—by the succeeding cards during the feed of the end card or other article in the supply-receptacle and renders it easier for the said first card to be moved into and through the throat 5 by the action of the parts which are concerned in occasioning the endwise movement of the card as it leaves the supply-receptacle. The importance of this will be appreciated in view of the fact that in the present machine after the first card in the supply-receptacle has been started through the throat 5 by the action of the feeder 4 the further onward movement of the said card is effected through the action of the printing devices. This reverse bending of the edges of the cards also lessens the tendency of the second card to pass into the throat 5. For the purpose of enabling the slide 30 and dogs 25 to be operated by hand when required I provide the rocker 37 with a handle 373, Figs. 1 and 5. This enables parts to be operated to place the edges of the cards to be carried forward properly preparatory to instituting the automatic action of the machine after placing a fresh lot in the feed-receptacle.

For the purpose of avoiding injury to the edges of the cards as the dogs 25 act to push the ends of the cards toward the throat 5 the advancing movement of the bars 26 is made yielding through the interposition of a spring or springs 32 at a suitable point in the train of devices. In the illustrated embodiment of the invention I have introduced a light spring 32 between each bar 26 and the slide 30, thereby rendering each bar 26 capable of yielding independently. To this end (see more especially Figs. 1, 5, and 7) the rear extremity of each bar 26 is bent outward at right angles to the length of the bar and has attached thereto a threaded stud or bolt 43, passing through a hole in an outwardly-projecting lug 44 on the slide 30. A spiral spring 32 on the stem of the said bolt or stud is compressed between the end of bar 26 and a washer 46, bearing against the said lug or ear 44. Nuts 47 on the studs or bolts 43 serve to adjust the position of the bars 26 and their dogs 25.

The inner or throat end of each bar 26 is rabbeted, and the rabbeted portion passes behind the pin 48.

The end piece 3 at the inner end of the feed-receptacle is shaped in plan as shown in Figs. 1 and 9. Its inner portion is designed to receive the pressure which is transmitted through the stack of cards, while to the right of this portion the said end piece is curved forwardly to afford room for the working of the feeder 4. The said feeder is arranged to work transversely across the inner end of the supply-receptacle, and it is furnished with a series of spring-pressed dogs 49, Figs. 8 and 10, which are designed to engage with the right-hand end of the first card, so as to cause the said card to be advanced endwise when the inward movement of the feeder 4 takes place. The dogs 49 are located in recesses 50 in the feeder 4, one above another, as clearly indicated in Fig. 8, and are pivoted upon a vertical pin 51. Each dog 49 is acted upon by an expansion spiral spring 52, which tends to project the dog 49 from its containing-slot, the outward play of the dog 49 being limited by means of a vertical pin 53, passing through an enlarged hole 54 in the dog. The said pin 53 coöperates with all the dogs 49. When the feeder 4 is in its extreme right-hand position, the springs 52 hold the engaging portions of the dogs 49 49 projected into position to engage with the right-hand end of the first card in the advancing end of the said feeder 4 toward the left, so as to cause the said card to be carried forward with the feeder 4. In the return movement of the feeder 4 toward the right the pressure of the second card causes the dogs 49 49 to recede into their containing-slots. The tooth or engaging portion of each dog 49 is eccentrically disposed with relation to the pivot 51 of the dog 49, Fig. 10, the said engaging portion or tooth being considerably to the front of the said pivot 51 and somewhat toward the free end of the dog 49. This construction operates to cause the resistance which the card engaged thereby offers to being propelled by the movement of the feeder 4 to bring about a still firmer engagement of the dog 49 with the card, for such resistance acts with a tendency to cause the face 491 of the dog 49 in front of said tooth or engaging portion thereof to be pressed with a proportionately-increased force toward the said card. In other words, the resistance which the card offers to being moved through the engagement of the dog 49 therewith acts to cause the face of the dog 49 adjacent to the free extremity thereof to swing outward toward the card itself. The eccentric mounting of the dogs 49 49 causes the same to be projected by the action of their springs 52 until the faces thereof bring up against the surface of the first card in the supply-receptacle. Consequently in case the right-hand end of the said first card should not be in close contact with the face of the feeder 4 the said dogs will swing outwardly until their faces at the left of the teeth or engaging portions make contact with the surface of the said card, which will place their teeth or engaging portions in proper positions relatively to the right-hand end of the said card to engage with the said end when the feeder 4 is moved inward—i. e., to the left.

For the purpose of bridging the space between the feeder 4 and the inner portion of the end piece 3 the feeder 4 has affixed thereto a plate 541, Figs. 8, 9, and 10, formed with a number of tongues 55 55, working in shallow depressions 56 56 in the face of the end piece 3. The feeder 4 is mounted to slide transversely across the inner end of the supply-receptacle on guides 551, Figs. 2, 8, and 9, and for the purpose of actuating the same (see Figs. 8 and 9) it has connected pivotally thereto the free extremity of the arm or rod 59, provided with a strap 57, surrounding the eccentric 58 on the upright rotating sleeve 76.

60, Figs. 8, 9, and 10, designates a throat-piece, fixed adjacent the inner portion of the end piece 3 and the inner end of the side plate 2. The throat 5, through which the cards are caused to pass successively, exists between the proximate portions of the said throat-piece 60 and side plate 2. To the throat-piece 60 I apply the series of tongues 61 61, having the exposed faces thereof arranged to form one side of the throat 5, and to the side plate 2 I apply a somewhat similar set of tongues 62 62, having the free ends thereof disposed in position to form the other side of the said throat 5. The forward surface of the first card presses against the said exposed faces of the said tongues 61, while the left-hand end of the said card and of the corresponding ends of a few cards next succeeding the same make contact with the exposed side faces of the tongues 62. The tongues 62 62 are square-shouldered, and the space or passage-way normally existing between the side faces of tongues 61 61 and the ends of the tongues 62 62, such space constituting the throat 5, is parallel-sided. This passage-way or space corresponds substantially with the thickness of a card in order to prevent more than one card from entering at a time, except when two cards are firmly stuck together, being made just a little greater than the said thickness in order that a card may move through the said throat without meeting with undue resistance. The tongues 61 61 are fitted to slots 63, Fig. 10, in the throat-piece 60 and are backed up by springs 64, (see Figs. 9 and 10,) which act with a tendency to hold the faces of the said tongues in their normal positions. Similarly the tongues 62 62 are placed within the slots 65 65 in the end of the side plate 2 and are backed up by springs 66 66, which act with a tendency to hold the said tongues pressed forward into their normal working positions. The precise number of tongues 61 61 62 62 employed is not material. The dogs 25 25, which, as before stated, have their working ends arranged to act closely adjacent the throat 5, alternate in any desired vertical order with the tongues 62 62.

From the foregoing description it will be clear that the sides of the throat 5 are yielding, one side being made yielding in the direction in which the cards are pressed by the follower in the supply-receptacle and the other side being made yielding in the direction of the endwise movement of a card in being carried transversely out of the supply-receptacle. The reason for this is that for various causes two cards sometimes become so firmly stuck together that both move together under the action of the feeder 4, the union between the two cards being so strong that if the second card is held from passing through the throat 5 the first card will resist being advanced so strongly that the dogs 49 of the feeder 4 are very liable to tear or injure the said first card as the feeder makes its inward movement. For the purpose of avoiding injury to the first card under such circumstances the sides of the throat 5 are made yielding, as described. The object in giving the sides of the throat 5 a sectional construction and rendering the component parts of each side independently yielding is to compensate for various injuries to the cards which would tend to interfere with a proper feed of the cards if such compensation were not made. Various causes tend to occasion a thickening of the amount of material that is presented to the throat 5 in different portions of the height of the advancing end of the card. Sometimes the said end becomes battered and beaten back upon itself at one place or another. Sometimes a corner of a card becomes folded back upon itself. Sometimes the card becomes torn and bent back upon itself at an intermediate point. In all these instances there will be an increased thickness or double thickness of card presented for passage through the throat at some place or places in the height of the advancing edge of the card. By reason of the yielding sectional construction of the sides of the throat 5 those portions of either side of said throat at the place where the thickening of the card edge presents itself give way to the said thickening and allow the card to be fed through the machine without offering undue resistance to its passage or occasioning injury to the card.

The object in employing a series of independently-movable dogs 49 49 on the feeder 4 is to render each one of the same capable of independent engagement with the right-hand end of a card, so as thereby to insure the starting movement of the card even in case one or all of the remaining dogs 49 49 should fail to engage properly with the card or should be prevented from doing so. In some instances it happens that the edge of a card presented to the action of the feeder 4 is so bent or doubled over upon itself that at the place where thus bent the feeder 4 cannot become properly engaged with the card. If a single dog 49 or a rigid feeder-plate were employed, the feed would be missed; but the sectional construction of the feeder 4 insures proper feed of the card under the conditions just specified.

For the purpose of enabling the width of the opening of the throat 5 to be varied as required to suit the thickness of the cards or the like which are to pass therethrough I mount the throat-piece 60 movably and provide it with adjusting devices. In the illustrated embodiment of the invention the said throat-piece 60 is mounted upon threaded studs or bolts 67, Figs. 9 and 10, projecting from the outer surface of the end piece 3, expansion-springs 68 being interposed between the said end piece and the throat-piece 60, the said springs being mounted upon the said studs or bolts. Nuts 69 are applied to the threaded portions of the said studs or bolts and take against the back of the throat-piece 60. The said springs act with a tendency to force the throat-piece 60 away from the end of the side plate 2, the movement of the throat-piece 60 in this direction being limited by the said nuts 69, the position of the throat-piece 60 being determined by the adjustment of the nuts 69. The tail of the throat-piece 60 has a hole through which passes a threaded stem or bolt 70, projecting from the outer side of the end piece 3, the threaded part of the said stud or bolt having thereon a nut 71, between which and the outer side of the said tail is an expansion-spring 72, which spring is placed in a state of tension by the said nut and acts with a tendency to hold the convex boss 73 on the inner side of the said tail pressed firmly in contact with the outer surface of the end piece 3. Thereby the throat-piece 60 is steadied. It rocks on the said convex boss in being adjusted by the action of the nuts 69 and springs 68. The said convex boss is shaped like a portion of a sphere. This enables the throat-piece 60 not only to be adjusted by swinging it bodily toward or from the end of the side plate 2, but by being rocked in a vertical plane as required in order to adjust the width of the throat 5 at either the top or the bottom thereof, as may be necessary in practice.

74, Figs. 1, 18, and 20 to 23, is the printing-roll, and 75 is the backing-roll which coöperates therewith, the said rolls being located in such position that the advancing end of the card which is being pushed forward by the feeder 4 enters into their bite as it projects through the throat 5. The printing-roll 74 is mounted on a sleeve 76, which is fitted to an upright stud 77 and driven by means of a bevel-pinion 78 on the lower portion of said sleeve (see Fig. 8) meshing with a bevel-gear 79 on the main shaft 102, Figs. 14, 15, of the machine. The backing-roll 75 is sleeved upon an upright fixed stud 80 and is geared with the sleeve of the printing-roll by spur-gears, one of which is shown at 81, Fig. 8.

At the delivery side of the printing and backing rolls is located the receiving-receptacle 149, Figs. 1 and 11, for the printed cards, the said receptacle comprising the fixed end piece 83 adjacent the printing-roll 74 and the opposite side plates 84 and 85.

86 is a movable follower placed within the receiving-receptacle 149 and against which the cards are stacked as they are received in such receptacle 149. This follower 86 slides along the receptacle 149 as the latter fills.

87 is a pusher by means of which each card after being printed and passed into the receiving-receptacle 149 is pushed toward the follower 86 and out of the way of the advancing end of the next succeeding card. This pusher 87 extends crosswise of the receiving-receptacle 149 and is pivoted at 88 outside the latter, its swinging inner portion being caused to press against the entering card and push the same over in a direction of the follower 86. For the purpose of actuating the pusher 87 it is connected, by means of a link 89, with a three-armed lever 90, the latter being pivoted at 91 and actuated by means of a cam 92 and spring 93. The said link is connected with one arm of the three-armed lever 90. The said spring is connected with a second arm of the said lever, and the third arm of the lever carries a roll 94 to make contact with the acting surface of the said cam. The cam 92 is mounted on the sleeve 76 of the printing-roll 74. It operates to move the pusher 87 in one direction, while the spring 93 acts to move the pusher 87 in the reverse direction. Preferably I arrange the parts so that the spring 93 shall act to turn the three-armed lever 90 when permitted by the cam 92 to do so from the position of the said lever which is represented in full lines in Fig. 11 into the position thereof which is represented in dotted lines, thereby moving the pusher 87 forward from its retracted position (shown in full lines) to the projected position, (shown in dotted lines,) carrying ahead of it the card last fed into the receiving-receptacle 149, the cam 92 being arranged to return the lever 90 and pusher 87 positively to their former positions. My reason for causing the return of the pusher 87 to be effected positively through the action of the cam 92 is to prevent a misplaced card from clogging the pusher 87 and preventing it from returning, as would be likely to occur if the return movement of the pusher 87 were occasioned by means of the spring 93.

At 95, Fig. 11, I have shown a bent spring attached to a portion of the end piece 83 adjacent the outer side of the receiving-receptacle 149 and in the path of the card which is advancing from the printing and backing rolls, this spring 95 being so placed that it will arrest the onward movement of the card in such position that when the pusher 87 is projected from the full-line position of Fig. 11 into the dotted-line position of the said figure the rear end—*i. e.*, right-hand end—of the said card will be made to press against the surface of the backing-roll 75. The said surface being elastic engages frictionally with the said rear end of the card and operates to carry it forward from the adjacent end of the pusher 87, separating it from the said end of the pusher 87, so as to facilitate the entrance of the advancing end of the next succeeding card into the opening between the pusher and the rear end of the first card and also holding the said rear end from returning after the retraction of the pusher 87. This action of the backing-roll 75 obviates the necessity for employing any other device to detain the card from backward movement after being left by the pusher 87. The right-hand portion of the follower 86 is inclined somewhat, as shown in Figs. 1 and 11, to conform to the position which the cars are caused to assume by the action of the pusher 87 and the backing-roll 75.

The plate constituting the main portion of the follower 86 is attached to a bracket 96, Fig. 11, which is furnished with a sleeve 97, mounted upon a slide-rod 98, extending longitudinally of the machine. The said sleeve is made of considerable length, as shown, in order to secure steadiness of movement and obviate tendency to clamp or bind as it moves along the slide-rod 98.

The printing and backing rolls compress the upper portion of the card between them. The lower portion of the card is compressed between a roll 99, Figs. 8 and 15, on the sleeve 76 of the printing-roll 74 and a yielding roll 100, Fig. 15, on the lower portion of the sleeve 165 of the backing-roll 75. The object in providing for causing the card to be fed by means of the two pairs of rolls is to insure that it shall move straight in a horizontal line.

Between the backing-roll 75 and the lower roll 100 the sleeve 165 of the backing-roll 75 is furnished with a series of projecting collars 101, Fig. 15, spaced a slight distance apart from one another. Into the grooves adjoining these collars are entered tongues 115, projecting from the inner end of the side plate 84 of the receiving-receptacle 149. These tongues 115 in the present instance are constituted by strips of suitable material secured in slots in the end of the side plate 84. They bridge the gap between the end of the said side plate and the peripheries of the two rolls 74 and 75, so as to prevent the end of a card from getting caught in the said gap, while the free end of the tongues 115 themselves are sheathed by being entered into the said grooves.

For the purpose of operating the machine power may be applied by hand to the main shaft 102 directly, as by means of a crank mounted on the said shaft. I prefer, however, to arrange for driving the machine by power derived from a suitable motor, and in the drawings I have illustrated power-driving arrangements. Thus I have shown at 103, Figs. 12 and 13, a gear-wheel mounted on the said shaft, at 104 a pinion mounted on a short shaft 105, and at 106 a band-pulley fast on the said short shaft 105. Preferably I employ driving connections for the said main shaft 102, which are capable of being rendered operative and inoperative to transmit motion to the said main shaft at the will of the attendant upon the machine, and I also arrange the said driving connections so as to enable the working of the machine to be controlled through the agency of automatic detector devices that are contrived to provide for certain needs and emergencies in the working of the machine. In order to enable the driving power to be placed in and out of connection with the main shaft 102 of the machine, I utilize a suitable form of clutch. This clutch may in practice vary more or less, according to the views of the maker or user of the machine and according to the manner in which it is desired that it shall perform its work or coöperate with the detector devices and their connections, which I shall presently describe. Herein the large gear 103 is loose on shaft 102. For the purpose of connecting said gear with the said shaft and disconnecting it therefrom as and when required I have shown (see more especially Figs. 12 and 14) a preferred form of clutch comprising a small ratchet or detent wheel 107, which is fast with the large gear 103, so that it turns in unison with the latter, and a dog or catch 108, which is pivoted to a part that is fixed to the main shaft 102, so as to turn in unison with the latter. In the present instance the pivotal mounting of the said dog or catch 108 is by means of a pin or stud 109, projecting laterally from one of the arms of the large bevel-gear 79, fast on the main shaft 102. If the said dog or catch 108 is in engagement with one of the teeth of the small ratchet-wheel 107, rotation of the latter will communicate rotation to the main shaft 102 in unison therewith, thereby operating the machine. In connection with the dog or catch 108 I employ a controller therefor by means of which to determine or occasion and discontinue the engagement of the said dog or catch 108 with the small ratchet-wheel 107. This controller comprises in the present instance a toothed or ratchet wheel 110, rotating in unison with the large bevel gear-wheel 79, but capable of a certain amount of independent movement relatively to the latter. The said controller or ratchet wheel 110 is here shown as having a hole through one of its arms, (indicated at 111 in Fig. 14,) and through this hole 111 passes loosely the pin or stud 109, above referred to, which serves as the pivot of the dog or catch 108. The dog or catch 108 is in loose engagement with the controller-wheel 110. I have shown in Fig. 14 a pin or stud 112 projecting from one side of the controller-wheel 110 and working in a slot 113 in an outwardly-extending arm of the dog or catch 108. It will be perceived that if independent movement of the controller-wheel 110 relatively to the large bevel gear-wheel 79 be occasioned the working of the pin or stud 112, carried by the controller-wheel 110 within the slot 113 of the dog or catch 108, will cause the said dog or catch to turn around its pivot 109. A tension-spring 114 is joined at one extremity thereof to an arm of the large bevel gear-wheel 79 and at the other extremity thereof to the controller-wheel 110. This spring 114 acts with a tendency to move the controller 110 relatively to the large bevel gear-wheel 79 in a direction to throw the engaging end of the dog or catch 108 into engagement with a tooth of the small ratchet-wheel 107. Thereby the said dog or catch 108 is caused to assume a position in which it will engage with a tooth of the said ratchet-wheel, and thus the said small ratchet-wheel is connected with the main shaft 102, so as to transmit movement to the latter. Backward movement of the controller-wheel 110 relative to the large bevel gear-wheel 79 through a short distance will cause the engaging portion of the dog or catch 108 to be swung out of engagement with the small ratchet-wheel 107 in an obvious manner.

It will be clear from the foregoing that the tension-spring 114 acts through the controller-wheel 110 with a tendency to move the dog or catch 108, so as to cause it to engage with one of the teeth of the small ratchet-wheel 107, and that hence whenever the said tension-spring is free to act it will effectuate the clutching of the driving power to the main shaft 102 of the machine. For the purpose of occasioning the disengaging movement of the controller-wheel 110 and dog or catch 108 I provide a movable stop, which in one position thereof stands in the path of rotation of a projecting part or tooth of the controller-wheel 110, so as in the rotation of the main shaft 102 and the parts connected therewith to detain the said controller-wheel 110—that is to say, arrest its movement while the other parts continue to rotate. Such a stop is shown herein as comprising a stop-dog 122, Figs. 2, 12, 14, and 15, on an arm 116, forming part of a rocker 117, having its shaft 118 journaled in bearings that are provided in lugs or ears 119 on the under side of the table 120, the said rocker being furnished with an upwardly-extending arm or shipper-handle 121, by means of which the rocker 117 and stop-dog may be moved by hand when required. Movement of the rocker 117 in one direction will place the stop-dog in position to engage with one of the projections or teeth of the controller-wheel 110, and movement of the rocker 117 in the other direction will shift the stop-dog out of the path of rotation of the said projections or teeth. I have herein shown the controller-wheel 110 as formed with a series of ratchet-teeth at the periphery thereof, the stop-dog being shaped like an ordinary dog or pawl for engagement with the said ratchet-wheel.

In practice the driving connections will be proportioned to drive the machine at a comparatively high rate of speed. I make provision, therefore, to obviate hammering and shock when the dog or catch 108 is caused to engage with the small ratchet-gear 107 and when the stop-dog 122 is caused to engage with the controller-wheel 110. Thus I cushion the parts, as I will now proceed to explain. As shown most clearly in Fig. 14, the engaging portion of the dog or catch 108 is formed separate from the body or main part of the dog or catch and is movably applied thereto, a cushion being provided, against which the movable part brings up after being engaged with a tooth of the small ratchet-wheel 107. Herein the said movable engaging portion is shown connected with the main part of the dog or catch 108 by a pivot 123, and at 124 is shown an elastic cushion which is applied to one of the parts, herein the main portion or body of the dog or catch 108, in position to receive the pressure of the tail of the engaging portion as the said engaging portion is swung about its pivot 123 by the strain which is transmitted thereto by the tooth on the ratchet-wheel 107 which takes against the said engaged portion. A comparatively weak expansion-spring 125, interposed between the tail of the engaging portion and the body or main part of the dog or catch 108, serves to hold the said tail separated normally from the other part. In like manner the engaging portion of the stop-dog 122 is movable relatively to the rocker-arm 116, to which it is applied. (See Figs. 2, 14, and 15.) It is shown herein as formed with a central longitudinal socket 126, Figs. 2 and 15, receiving a pin or stud 127, projecting from the rocker-arm 116, the outer end of the said pin or stud being bored to form a cavity or chamber 128, which receives an expansion spiral spring 129, one end of which bears against the inner end or bottom of the said cavity or chamber 128 in the pin or stud 127, while the other takes bearing against the inner end of the central longitudinal chamber 126 of the stop-dog 122. This spring 129 acts with a tendency to move the stop-dog 122 longitudinally outward upon the pin or stud 127, the limit of the movement in this direction being determined by the heads of the screws 130 130. The stems 131 131 of these screws 130 pass through holes 132 132 in ears 133 133, with which the inner end of the stop-dog 122 is provided, their threaded portions being fitted to threaded holes in the rocker-arm 116.

At 135 is represented a cushion that is interposed between the proximate faces of the stop-dog 122 and rocker-arm 116. This cushion, as well as that designated 124 and applied between the parts of the dog or catch 108, consists of thin blocks or layers of india-rubber. The object in view of employing the expansion-spring 129 between the stop-dog 122 and the rocker-arm 116 and the like expansion-spring 125 between the two members of the dog or catch 108 is to enable the meeting faces of the respective parts to make contact lightly with each other before the effective resistance to the relative movement of the parts which is offered by the cushions begins to be felt. In this way hammering and shock are obviated.

The devices which have just been described operate to disconnect the driving power quickly and to instantly arrest the working of the machine without shock or jar. At the speed at which the machine is run in practice there is a tendency to recoil. To prevent recoil, I provide a recoil-dog 136, Fig. 14, which is pivoted to a depending ear or lug 137 on the table 120 of the machine, and I provide in connection with the main shaft 102 of the machine a series of projections or teeth for engagement with the said recoil-dog. Thus I have herein shown the large bevel gear-wheel 79 as provided adjacent the periphery thereof with a series of teeth 138, shaped as shown, to coöperate with the engaging end of the said recoil-dog 136. It is intended that in the recoil of the parts following after the engagement of the stop-dog 122 with a tooth of the controller-wheel 110 the recoil-dog 136 shall take against one of the teeth on the large bevel-gear 79, and thus hold the main shaft 102 from any appreciable extent of retrograde movement or recoil. It is undesirable that the recoil-dog 136 should be permitted to rest normally against the teeth 138 of the bevel-gear 79 on account of the noise which would result therefrom in the running of the machine. I therefore preferably employ means of holding the said recoil-dog normally out of the path of rotation of the said teeth and of shifting it into the said path at the moment or substantially the moment of bringing about the action of the stop-dog 122. Thus I have herein shown a finger 139 interposed between the stop-dog 122 and a recoil-dog 136, by means of which the stop-dog 122 when placed in its uplifted position is instrumental in holding the recoil-dog 136 in an abnormal uplifted position free from contact with the teeth of the large bevel gear-wheel 79. When the stop-dog 122 is moved into position to engage with the controller-wheel 110, it allows the recoil-dog 136 to move into position for engagement with the said teeth. It happens sometimes that after the machine has been brought to rest the recoil-dog 136 is held so firmly by the pressure of one of the teeth of the large bevel gear-wheel 79 against the engaging portion of the said recoil-dog 136 considerable force is required to be exerted in order to move the said recoil-dog 136 back into its inoperative position. This would render it difficult to move the stop-dog 122 into its inoperative position by hand, and therefore I render the said finger 139 yielding by forming it as a flat spring attached to the recoil-dog 136 and projecting into position to be engaged by the stop-dog 122.

It is intended that the rocker 117 shall gravitate when free to do so into position to place the engaging end of the stop-dog 122 in position to make contact with one of the teeth of the controller-wheel 110. For the purpose of increasing the tendency of the rocker 117 thus to move I have in the drawings represented a weight 140, Fig. 2, suspended from the arm 141, projecting from the sleeve of the rocker 117.

One object of the invention is to provide for stopping the working of the machine automatically when the last card has been passed forward from the feed-receptacle. To this end I apply to the follower 6 a feeler which is made movable and is arranged to coact with the cards within the feed-receptacle in front of the face of the said follower 6 in such manner that when the last card has been passed forward to the printing devices from the said feed-receptacle the said feeler shall indicate the fact, the said feeler having employed in connection therewith devices by means of which on exhaustion of the supply of matter to be printed the working of the machine shall be arrested automatically. Herein the feeler is constituted by a pin 144, Figs. 1 and 2, fitted within a tubular bearing 145 on the follower-frame 7 and having the forward end thereof arranged to take bearing against the last card in the feed-receptacle. A hole 146 is formed through the movable follower 6, and into the said hole the front end of the said pin 144 is loosely fitted. The rear end of the pin 144 projects at the rear of the tubular bearing 145. To the follower-frame 7 I pivot a handle 147, which may be taken hold of by the attendant upon the machine when he desires to retract the follower 6 to the rear or outer end of the feed-receptacle, the extent of outward movement of the said handle 147 upon its pivot being limited by the cross-bar 150, Fig. 2, applied to the lower part of the handle 147 and making contact with the tube 9, connected with the follower 6. To the upper part of the handle 147 is pivoted the catch 151, having a shoulder 152 to coact with the rear end of the movable feeler-pin 144 and a finger 153 to make contact with the top of the follower 6 to arrest the downward movement of the catch 151. The handle 147 at one side is furnished with a pin 154, which passes below a rocker 155. The latter comprises simply a rod having its ends somewhat offset or crank-shaped, so as to provide journals which are eccentric with relation to the main portion of the length of the rocker. The said rocker extends longitudinally of the supporting-rod 10, on which the follower 6 slides, and the bearings receiving its journals are located adjacent the ends of the said rod. The said rocker 155 is furnished with an arm 156, projecting laterally therefrom at substantially right angles, which is connected by a tension spiral spring 157 with the arm 141 of the stop-dog rocker 117, the said arm being made fast upon shaft 118 of said rocker. The strain that is transmitted through the said tension-spring to the arm 156 of the rocker 155 operates with a tendency to cause the said rocker to bear downwardly upon the pin 154, carried by the handle 147, thereby tending to swing the handle 147 upon its pivots toward the follower 6. This transmits pressure through the catch 151 to the movable feeler-pin 144. So long as a card remains pressed between the movable follower 6 and the plate 3 of the feed-receptacle the feeler-pin 144 will be held thereby from moving under the pressure thus transmitted. When, however, the last card has passed out of the feed-receptacle, the feeler-pin 144 will be free to move lengthwise through its tubular bearing 145, and the forward end thereof will pass into a hole 1461, Fig. 8, in the end plate 3 of the feed-receptacle 148. As the feeler-pin 144 thus moves forward its rear end will release the catch 151, this permitting the handle 147 to swing forwardly toward the follower 6. In this movement of the handle 147 the inclined face of the finger 153 of the catch 151 will ride against the top of the follower 6, which will tilt the said catch upwardly, so as to cause its shoulder to clear the rear end of the tubular guide or bearing 145 on the follower 6 for the movable feeler-pin 144. As the handle 147 rocks after having been thus freed the rocker 155 will turn, relieving the tension of the tension-spring 157 and allowing the stop-dog rocker 117, the latter having previously been held in a position to maintain its stop-dog 122 in engagement with the teeth of the controller-wheel 110, to turn and place the said stop-dog 122 in engagement with the controller-wheel 110. For the purpose of counteracting the tendency of the catch 151 to fly upward under the influence of the pressure with which its shoulder is forced into contact with the rear end of the movable feeler-pin 144 the said rear end is made with a downward and forward incline, as shown at 159, Fig. 2. With this downward and forward incline the pressure tends to force the catch 151 more completely under the rear end of the feeler-pin 144, and it also relieves the said feeler-pin 144 of a degree of endwise pressure which would tend to bear its forward end with too much force against the card in front of the same. To the handle 147 is pivoted loosely a catch 160, which engages with a raised shoulder 161 on the table 120 of the machine to hold the follower 6 in its retracted position when it is desired to have the interior space of the feed-receptacle left clear and free for the introduction of cards or for other purposes. This catch 160 has a lateral extension 162 in position to be pressed upon by a thumb or finger of the hand with which the handle is grasped, whereby the disengagement of said catch from the said raised shoulder 161 may be effected manually, and a pin 163 on the side of the catch 160, resting on one of the guiding-surfaces 18, prevents the catch 160 from dropping too low.

Only one card at a time should pass forward from the supply-receptacle to the printing devices. I have provided means whereby in case two or more cards should be passed forward together to the printing devices the fact will be detected and a signal given to apprise the person in charge of the machine and whereby also, if desired, the action of the machine will be automatically arrested. Preferably I combine detector devices for ascertaining when more than one card is fed forward at a time with a signal and with automatic stopping devices, substantially as I will now proceed to explain, although in some embodiments of the invention the connection of the said detector devices with automatic stopping devices may be omitted. As a means of ascertaining when excess feed occurs—that is to say, when more than one card passes forward at a time—I employ a detector, herein constituted by a gage 164, Fig. 16, having the operative end thereof brought into close proximity to a portion 158, Fig. 15, of the backing-roll 75. The said gage is curved, as shown, to clear certain of the parts which relate to the inking mechanism, and it is carried by a rocker 166, which is mounted to swing in a horizontal plane. In the illustrated form of the machine (see more especially Fig. 15) the head of the rocker 166 is disposed vertically, with the extremity of the lower vertical arm thereof shaped to constitute a conical journal 167, which is fitted to a corresponding bearing in the stand 169, the upper extremity of the other vertical arm of the head being formed with a bearing to receive the conical end of a screw 168, that is applied to the overhanging upper arm of the said stand, this screw being adjustable and being provided with a lock-nut 170. The rocker 166 is provided with a stem 166$^a$, which is hollow (see Fig. 17) to receive the shank 171 of the gage 164 and also receives a spiral spring 172, surrounding the said shank, the said spring being compressed between a shoulder 173 on the said shank and an internal shoulder 174 of the rocker 166. The outer portion of the said shank is screw-threaded and has the nuts 175 applied thereto for the purpose of effecting a minute adjustment of the gage 164, so as to enable the distance between the acting surface of the working end thereof and the opposing surface of the backing-roll 75 to be regulated to a nicety, and thereby made to conform with precision to the thickness of the individual cards which are required to be operated upon. A tension-spring 176, having one extremity thereof connected with a pin 177 on the gage 164 and the other extremity thereof connected to a pin 178, carried by a small stand on the table 120 of the machine, acts with a tendency to hold the gage 164 and the rocker 166 in the working position which is represented in Fig. 16. This spring 176 tends to move the gage 164 in the direction which is opposite that in which the cards travel as they pass the printing devices and to hold the inner end of the slot 179, that is formed through a projecting part 180 of the gage 164, in contact with the stem of the screw 181, applied to the said stand. The said spring 176 holds the gage 164 in the normal or working position that is represented in the said figure. The gage 164 having been adjusted by means of the devices which have been described to suit the thickness of the individual cards which are to be operated upon, it will follow that so long as the cards are fed singly to and past the printing devices they will pass successively through the space between the working end of the gage 164 and the backing-roller 75 without affecting the position of the gage 164. Should, however, more than one card be passed forward together, the increased thickness will bind between the gage 164 and the backing-roll 75 and will, in effect, clutch the gage 164 to the backing-roll 75, so that in the continued rotation of the latter and advance of the cards therewith the gage 164 will be carried onward in the direction of movement of the cards, swinging the same and the supporting-rocker 166 therefor around the pivotal axis of the said rocker.

As a convenient means of signaling to the attendant upon the machine the fact that the detector device has acted I provide a bell 182, Fig. 16, the hammer 183 of which is mounted on a small lever 184, pivoted at 185 and loosely connected by means of a pin 186, working in a slot 187 of the said lever, with the bolt 188 working in the case 192, the stem of the said bolt being surrounded by an expansion spiral spring 189, Fig. 19, which is compressed between a shoulder 190 on the bolt 188 and an internal shoulder 191 of the case 192. A pin 188$^a$, projecting from bolt 188 and working in a longitudinal slot in one side of case 192, holds the bolt from turning. A small block 193, carried by the inner end of the said bolt 188, is engaged by a pivoted latch 194. The tension-spring 195, connected with a projecting portion of the said latch and with the hammer-lever 184, operates to hold the latch 194 normally in position to engage with the block 193 on the inner end of the spring-actuated bolt 188. A rocker 196, mounted upon a fixed vertical pin 197, has an arm 198, the free extremity of which projects into proximity to the engaging portion of the latch 194. An arm or finger 199, carried by the supporting-rocker 166 for the gage 164, extends at its free extremity into close proximity to the said arm 198. When now the gage 164 detects an excess feed and the same and rocker 166 are swung forward in the manner which has been explained above, the arm or finger 199, carried by the gage-supporting rocker 166, encounters in its movement the arm 198 of the other rocker, 196, turning the said rocker 196 about its pivotal axis 197 and causing its arm 198 to press against the latch 194, thereby disengaging the latter from the block 193, carried by the spring-actuated bolt 188, which last thereupon is forced endwise by the expansion of its spring 189, turning the hammer-lever 184 about its pivot 185 and causing the hammer 183 to strike the bell 182.

For the purpose of bringing about the automatic stoppage of the machine I connect with the handle 121 by a pivot 200 a small link 201, having therein a longitudinal slot 202, receiving a pin 203, projecting laterally from the spring-actuated bolt 188, the said pin usually for convenience being formed as the stem of the engaging block 193. When, now, the latch 194 is disengaged as aforesaid from the said engaging block 193, the inward movement of the spring-actuated bolt 188 not only operates the hammer 183 and sounds the bell 182 as aforesaid, but through the pin 203 and link 201 aforesaid it acts to turn the handle 121 and through the agency of the stop devices which have been described arrest the motion of the parts of the machine. The purpose of the slot 202 in the link 201 is to enable the handle or controller-lever 121 to be moved by hand when required during the running of the machine to arrest the working of the parts temporarily when it is desired by the attendant to do so for any purpose—as, for example, when he wishes to ascertain the quality of the work being done (the postmarking or printing) or to make some adjustment of any of the parts of the machine. The extent of the inward movement of the spring-actuated bolt 188 is limited by nuts 204, applied to the threaded outer end of the said bolt. When handle 121 is moved by hand to restart the machine after stoppage, the latch 194 is caused by spring 195 to automatically reëngage with block 193.

From the foregoing it will be clear that in practice the detector devices for ascertaining when excess feed occurs—that is to say, when more than one card is fed forward at a time—may be combined simply with the signal or simply with the stop-motion devices, or with both together, according as preferred.

I have provided means for detecting a misfeed—i. e., a failure of the feeding devices to advance a card at the proper time. Thus, having reference to Figs. 18 and 19, I have shown a detector 205, mounted to swing horizontally on a vertical pivot at 206, applied to a small stand 207, the said detector having joined thereto a wire or the like connector 208, with which is connected the contracting spiral spring 209. This spring 209 acts upon the detector 205 with a tendency to bear the working end thereof toward the backing-roll 75 and cause the said end to enter a circumferential groove 210 in the said backing-roll 75. The presence of a card between the detector 205 and the backing-roll 75 will, however, suffice to arrest the movement of the detector 205 under the influence of the said spring. The detector 205 (see more especially Fig. 19) is connected by a link 211 with a pivoted latch 212, having a hook or shoulder 213 at its free extremity. This latch 212 is intended to coöperate with a shoulder 214 on a rocker 215, which is shown separately in Figs. 24 to 26, Sheet 16. The said rocker is mounted on vertical pivots at 216, the said rocker having a pin or projection 217, with which is connected one extremity of a contraction spiral spring 218, the other extremity of the latter being connected with a small stand 219, Fig. 18, on the supporting-arm for the inking-roller 232. The said spring acts with a tendency to bear the projection 220 of the said rocker 215 against the periphery of the cam 221, rotating in unison with the printing-roll 74. The prominent portion of the said periphery forces the rocker 215 into a position which enables the hook or shoulder 213 on the latch 212 to be moved in behind the shoulder 214 on the said rocker 215 if the latch 212 is swung through its connection with the detector 205 by reason of the entrance of a card between the said detector and the backing-roll 75. The latch 205 having been moved as just described it acts to hold the rocker 215 from moving under the influence of the spring 218, so that in consequence its projection will not enter the depression in the cam 221. If, however, a misfeed should occur—that is to say, if the devices which start or feed the cards successively should fail to advance a card at the proper moment or not at all—the detector 205, acting as a misfeed-detector, would be held by its spring 209 in its normal position, with the working end thereof in the circumferential groove 210 of the backing-roll 75, which would maintain the latch 212 in its retracted position. This would leave the rocker 215 free to be moved by the spring 218, and consequently its projection would enter the depression of the cam 221, with the result that the pin 222, projecting downwardly from the said rocker 215, would bear against the tail of the latch 194, turning the said latch so as to disengage it from the small block 193 on the spring-actuated bolt 188, thereby rendering the said bolt free to be pressed endwise by its spring 189. The end of rocker 215, which carries pin 222, extends above one arm of the latch 194. (See Fig. 19.)

For the purpose of detecting the failure of a card to be discharged from the printing or postmarking devices after having entered between the same I provide as follows: I provide a dog or tooth 223, which I cause to rotate in unison with the printing-roll 74, Fig. 18. Herein I have shown the said dog or tooth affixed to the upper side of the said roll. The arm 224 of the rocker 196 is provided with a tooth or dog 225 for interaction with the said tooth or dog 223. The said rocker 196 has connected therewith one extremity of a contracting spiral spring 226, the other extremity of which is connected with the pin 217 on the rocker 215, the said spring acting with a tendency to hold the rocker 196 in a position in which the dog or tooth 225 carried thereby is just outside of the path described by the dog or tooth 223 on the printing-roll 74. When, however, the rocker 215 is pressed outwardly by the raised portion of the periphery of the rotating cam 221, a pin 227, projecting upwardly from the said rocker 215, is caused to press against the arm 198 of the rocker 196, swinging the latter, so as to cause its dog or tooth 225 to pass within the path of rotation of the dog or tooth 223 on the printing-roll 74. It has been explained that the entrance of a card between the detector 205 and the backing-roll 75 in being fed forward by the starting devices acts to move the said detector outwardly in such manner as through the connecting-link 211 to place the latch 212 in position to engage with the shoulder 214 on the said rocker 215 when rocker 215 is in its outer position, and thereby prevent such rocker from moving inwardly again when the depression of the cam 221 presents itself to the projection 220 on the said rocker. I have explained that thereby the rocker 196 is prevented from disengaging the latch 194 from the spring-actuated bolt 188. However, should a card which has been fed in between the backing-roll 75 and the detector 205 fail to be discharged it will by remaining in the said position continue to hold the latch 212 in engagement with the shoulder 214 on the rocker 215, so that when the slight depression of the periphery of the rotating cam 221 presents itself to the projection 220 of rocker 215 the projection 220 of the said rocker 215 will be prevented from following the depressed surface of the cam 221. This depression is provided for the purpose of permitting the two rockers to be moved by their connected springs, so that the dog or tooth 225, carried by the rocker 196, will be placed outside of the path of rotation of the dog or tooth 223 on the printing-roll 74. When the rocker 215 is held locked in its outer or idle position by the continued engagement of the latch 212 with the shoulder 214 thereon, the pressure of the pin 227 against the arm 198 of the rocker 196 holds the said dog or tooth 225 within the said path of rotation, and consequently the dog or tooth 223 on the printing-roll 74 in coming around engages the dog or tooth 225 on the rocker 196, and thus occasions a turning movement of the said rocker 196, which causes its arm 198 to press the holding-latch 194 out of engagement with the block 193 on the spring-actuated bolt 188. The depression of the rotating cam 221 is placed in position to enable the dog or tooth 225 to recede or withdraw from within the path of rotation of the dog or tooth 223, carried by the printing-roll 74, in season to escape being caught by the latter in case the card is properly delivered from between the printing and backing rolls. It will thus be perceived that the feeler 205 acts both as a missfeed-detector and also as a full-feed detector—that is to say, in its double capacity it acts to detect a failure of the card or other article to feed or to complete its feeding movement past the printing and backing rolls.

For the purpose of relieving the shock incident to the engagement of the two dogs 223 and 225 with each other I pivot the dog 225 upon the rocker 196 by means of a screw 228 and connect with the tail of the said dog one extremity of a contracting spiral spring 229, the other extremity of which is connected with a suitable part of the rocker 196, the limits of movement of the dog 225 being defined by means of a screw 230, passing through a slot 231 in the dog 225. It is intended that immediately after the rotating dog 223 has engaged the dog 225 and swung the rocker 196, so as to turn the latch 194 and disengage the spring-actuated bolt 188, the two dogs shall be permitted to become disengaged from each other in order thereby to avoid breakage or injury to any of the parts of the machine. This disengagement or release of the dogs is permitted by the pivotal mounting of the dog 225 on the rocker 196, the spring 229, which is connected with the said dog 225, yielding to permit the latter to turn in the required manner.

The inking-roll is shown at 232, Figs. 1 and 9, mounted on a vertical spindle 233, carried by the horizontal swinging arm 234, the latter being mounted to rock on a vertical pin 235 or post extending upward from the table 120. A second arm is shown at 236, it being independently mounted upon the said post or pin and being furnished with a roll 237, which works in connection with the periphery of a cam 238, rotating in unison with the printing-roll 74. The purpose of the cam 238 is to hold the inking-roll 232 away from the periphery of the printing-roll 74, except at such times as the printing-surfaces of the latter are presented in position to have ink applied to the same by the inking-roll 232. The cam 238 acts more directly to move the roll-carrying arm 236, and the outward movement of the latter is transmitted to the arm 234, on which the inking-roll 232 is supported. A contracting spiral spring 239, connected with a projecting portion 260 of the carrying-arm 234 of the inking-roll 232, acts with a tendency to bear the inking-roll 232 toward the printing-roll 74. The effects of this spring 239 are also transmitted to the other arm 236, with the effect of carrying the antifriction-roll 237 on said arm 236 toward the periphery of the cam 238. If the construction were such as to permit the antifriction-roll 237 to leave the surface of the cam 238—for instance, at those times when the surface of the inking-roll 232 is in contact with the printing-surface of the printing-roll 74—there would be a distinct blow when the cam 238 and roll 237 again came in contact with each other, which would produce hammering in the working of the machine. It is for the purpose of obviating this hammering, which is incident to the renewed contact of the cam 238 and roll 237 with each other, that I employ the two separate arms 234 and 236. I interpose between the said arms an expansion spiral spring 240, (see especially Fig. 27, Sheet 16,) which acts with a tendency to force the two arms 234 and 236 away from each other. This spring 240 is weaker than the main spring 239, and consequently so long as the more prominent portion of the cam 238 is in contact with the antifriction-roll 237 the said main spring 239 is permitted to act with sufficient force to compress the expansion-spring 240. When the inward movement of the arm 234, carrying the inking-roll 232, is arrested by contact of the inking-roll 232 with the printing-surface of the printing-roll 74, the expansion of the spring 240 operates to occasion an independent movement of the second arm 236, thereby maintaining the antifriction-roll 237 in continuous contact with the surface of the rotating cam 238. The drop or depression of the said cam 238 is considerably greater than actually is required to enable the surface of the inking-roll 232 to touch the printing-surface of the printing-roll 74. The object of this is to give such an excess of inward movement to the second arm 236 as to enable the latter to wholly clear the carrying-arm 234 of the inking-roll 232, and thereby allow the inking-roll 232 perfect freedom to take bearing against the printing-surface of the printing-roll 74. In order to avoid shock and hammering between the two arms when the second arm 236 in its outward movement again picks up the roll-carrying arm 234, I interpose a cushion 241 of blow-absorbent material between the two arms, as shown best in Fig. 27, Sheet 16. Either rubber or leather may be employed, although other substances may be substituted.

In consequence of use the material constituting the ink-absorbent portion of the inking-roll wears away, thus reducing the diameter of the said roll. For the purpose of compensating for this wear and reduction of diameter I employ provision for adjustment between the two arms. In the present instance I place the blow-absorbent cushion 241 in a socket or cup 242, Fig. 27, which is placed within a recess of the roll-carrying arm 234, the said socket or cup having a threaded stem 243, which is fitted to a threaded hole in the said arm 234, it having a locknut 244 applied thereto. By turning the socket or cup 242 the cushion 241 may be caused to project more or less, and thereby the extent of movement of the two arms 234 and 236 relative to each other may be regulated as required, in order to compensate for wear, as aforesaid.

The provisions for adjustment which have just been described also enable me to vary as desired the amount of printing-surface measured circumferentially of the printing-roll 74 to which ink is applied. This enables me to vary as desired the length of the imprint which is made by the printing-roll 74 upon the card that is passed through the machine. For example, assuming that the printing-roll 74 is provided with a line or lines of characters to print the place, date, and time of cancellation, and following the same with a series of bars or the like for purposes of cancellation, this latter series being equal in length the longest line of letters or numerals which is likely to be required, it is possible by the adjustment of the cushion 241 aforesaid to so time the contact of the inking-roll 232 with the printing-surface of the printing-roll 74 that it shall come in contact with the said printing-surface just at the beginning of the line of letters and pass out of contact with the said surface just at the end of the said line, however much the length of the said line may vary. By this means only that portion of the series of canceling-bars will be caused to print which agrees in length with the line of letters or characters above the same.

One aim of my invention is to obviate the necessity which has existed heretofore in postmarking and canceling devices and machines for the removal and insertion of the printing characters or a portion thereof. Usually the canceling and postmarking stamp in general use comprises a block containing permanently the name of a town or city and that of a State and also having provisions for the removable application thereto of type for the date and time of canceling. These latter type have to be changed very frequently and in some places many times a day. In my present invention the characters which require occasional or frequent change instead of being on removable type are provided on type-wheels or the equivalent thereof, which are movably combined with the printing-wheel, so that by simple shift of the same without removal they may be arranged to print any required date or hour. Having reference to Figs. 20 to 23, I have shown an arrangement in which the name of a city and that of a State, as well as the number of a year, are permanently affixed to the main portion or body of the printing-roll, although it may be explained that these are formed on or applied to plates 245, which are detachably secured by bolts 261 261 to the printing-roll 74, so that when occasion requires they may be removed and replaced by others. The characters for printing the date and hour of cancellation are shown provided on a series of type-wheels 246 246, which are mounted upon a pin 247, having its ends suitably supported. For the purpose of holding the wheels 246 246 locked after having been adjusted into the desired position I may employ any suitable means, although herein I have represented a series of dogs 248 248, one for each wheel, each dog 248 being notched suitably to engage with the ends of the projecting type on its wheel, as indicated in Fig. 23, and being acted upon by an expansion spiral spring 249, that is compressed between the body of the dog 248 and a bar 250, extending across the series of dogs above the same. Each dog has an upwardly-extending projection 251, by means of which the dog 248 may be lifted when it is required to rotate the corresponding type-wheel 246 for the purpose of readjustment. The assembly of type-wheels is barrel-shaped—that is to say, the wheels are of varying diameters—and the type are curved transversely, so that a given series of characters brought into line at the periphery of the printing-roll 74 will correspond truly in curvature with the periphery of the said roll, or, at any rate, will be concentric with the roll 74. This secures an even and uniform imprint.

262 designates the line or series of canceling-bars.

I do not lay separate claim herein to the postmarking-roll, the inking arrangements, and the driving-clutch and dead-stop arrangements. These are made the subject of claims in divisional applications filed, respectively, April 1, 1901, Serial No. 53,986, and July 10, 1901, Serial No. 67,721.

I claim as my invention—

1. In combination, the supply-receptacle having the throat, a feeder acting in connection with the contents of the supply-receptacle to advance the same into the said throat, and pushing means to engage with the ends of the said contents and advance the same along the receptacle toward the said throat, substantially as described.

2. In combination, the supply-receptacle having the throat, a feeder acting in connection with the contents of the supply-receptacle to advance the same into the said throat, and a reciprocating pushing device acting with yielding force against the ends of the said contents to advance said ends along the receptacle toward the said throat, substantially as described.

3. In combination, the supply-receptacle having the throat, a feeder acting to advance the contents of said supply-receptacle transversely of the latter into the said throat, and a reciprocatory dog engaging with the ends of the said contents to advance the said ends into position to enter the throat when the feeder acts, substantially as described.

4. In combination, the supply-receptacle having the throat, a feeder acting to feed the contents of said supply-receptacle transversely of the latter into the said throat, and means acting to draw back the ends of the contents of the supply-receptacle during the feed of the end card or other article in the supply-receptacle, substantially as described.

5. In combination, the supply-receptacle having the throat, the feeder acting transversely of the supply-receptacle, the reciprocatory slide, and the spring-actuated movable dogs carried by said slide to engage with the ends of the contents of the supply-receptacle, substantially as described.

6. In combination, the supply-receptacle having the throat, the feeder acting transversely of the supply-receptacle, the reciprocatory slide, the spring-actuated movable dogs carried by the said slide to engage the ends of the contents of the supply-receptacle, and the springs whereby the respective dogs are rendered yielding in the movement of the slide, substantially as described.

7. In combination, the supply-receptacle having the throat, the feeder, the reciprocatory slide, the bars operated by the said slide, the springs employed in connection with the said bars to render them yielding, the dogs carried by the said bars, substantially as described.

8. In combination, the supply-receptacle, the follower therein, the long spiral spring having one extremity thereof connected with the follower, the guide-pulley over which the said spring extends and by which its direction is changed, the rod entering into the said spiral spring, and the collar, adjustably secured upon the said rod, and having the other extremity of the spring connected therewith, substantially as described.

9. In combination, the supply-receptacle, the follower therein, means to advance the follower along the supply-receptacle with yielding force, the handle connected with said follower and having an extension projecting into position to be pressed upon by a thumb or finger of the hand having hold of said handle, and the latch applied to the follower, and the fixed stop for engagement by the said latch to hold the follower in a retracted position, substantially as described.

10. In combination, the supply-receptacle, the follower therein, the follower-frame having the follower connected therewith by ball-and-socket joint, and means to advance the follower-frame and follower to move forward the contents of the supply-receptacle, substantially as described.

11. In combination, the follower-frame, the collar 19 applied thereto having the spherical section, the follower having the concavity to receive the spherical portion of said collar and the rabbeted hole therethrough, the flanged nut, and the securing-bolt, substantially as described.

12. In combination, the supply-receptacle having the end plate formed with transverse grooves alternating with raised portions, the feeder located at one side of said end-plate and having the tongues bridging the space between said end plate and feeder and working in the said grooves, and the follower to compress the contents of the supply-receptacle toward the said end plate, substantially as described.

13. In combination, the feeder, the plurality of independently-acting dogs movably mounted on said feeder, having teeth or shoulders to engage with the edge of the card or the like to be fed, and surfaces to engage with the face of the said card to limit the movement of the dogs relative to the card, and the springs to project the said dogs to carry the said surfaces thereof into contact with the face of the card, substantially as described.

14. In combination, the feeder, and the plurality of independently-acting dogs pivotally connected with said feeder, having the surfaces to engage with the face of the card to be fed, to limit the movement of the dogs relatively to the said card, and also having the engaging portions thereof eccentrically disposed as aforesaid, whereby resistance of a card to being advanced increases automatically the engagement of the respective dogs therewith, substantially as described.

15. In combination, the feeder, the plurality of independently-acting dogs pivotally connected with said feeder, having the surfaces to engage with the face of the card to be fed, to limit the movement of the dogs relatively to the said card, and also having the engaging portions thereof eccentrically disposed as aforesaid, whereby the respective dogs automatically increase their hold upon the card or the like being fed, the springs acting to project the said dogs into position to act, and means to limit the outward movement of the dogs, substantially as described.

16. In combination, the feeder, the plurality of independently-acting dogs pivoted thereto, the springs acting to project the respective dogs into engaging position, and the wire or pin acting as a stop for the dogs in common, substantially as described.

17. In combination, the feeder, and opposing sectional throat-pieces having the surfaces thereof disposed to form a right-angled entrance to the passage-way or throat between them through which cards or the like are fed by the said feeder, the sections being individually yielding, and the said right-angled entrance to said throat admitting only one card at a time under normal conditions, substantially as described.

18. In combination, the feeder, and end piece, and a side piece having between the same and the end piece a throat for the passage of a card or the like fed by the said feeder, the said throat having a right-angled entrance admitting only one card at a time under normal conditions, and the said side piece having a plurality of yielding tongues located at one side of the said throat to accommodate irregularities in the cards or the like, substantially as described.

19. In combination, the supply-receptacle having a side plate and a throat adjacent one end of said side plate, the said throat having a right-angled entrance admitting only one card at a time under normal conditions, the feeder to advance a card or the like edgewise through the said throat, and a plurality of yielding tongues located at the end of said side plate, constituting one side of said throat, and giving way to accommodate unevenness in the thickness of a card or the like, substantially as described.

20. In combination, the supply-receptacle having an end plate and a narrow throat adjacent the same, the said throat having a right-angled entrance, admitting only one card at a time under normal conditions, the feeder to advance a card or the like edgewise through the said throat, and a plurality of yielding tongues in line with said end plate and forming one side of the said throat, substantially as described.

21. In combination, the supply-receptacle having a side plate and an end plate with a throat intervening between the same, said throat having a right-angled entrance admitting only one card at a time under normal conditions, the feeder to advance a card or the like edgewise through the said throat, a plurality of yielding tongues located at the end of said side plate and constituting one side of said throat, and a plurality of yielding tongues in line with the end plate and forming the other side of the throat, substantially as described.

22. In combination, the supply-receptacle having a side plate and an end plate, with a throat intervening between the same, the feeder having the plurality of independently-acting dogs, a plurality of yielding tongues located at the end of said side plate and constituting one side of said throat, and a plurality of yielding tongues in line with the end plate and forming the other side of the throat, substantially as described.

23. In combination, a pair of rolls, a yielding stop to arrest a card or the like discharging from said rolls before it has quitted the latter, and a pusher acting to press said card transversely and thereby carry the following end thereof into contact with the periphery of one of said rolls, whereby said periphery is caused to feed said end away from the path of the advancing end of the next succeeding card, substantially as described.

24. In combination, a pair of rolls, a stop to arrest a card or the like discharging from the said rolls before it has quitted the latter, a reciprocatory pusher and means to actuate said pusher whereby it is caused to press said card transversely and thereby carry the following end thereof into contact with the periphery of one of said rolls, whereby said periphery is caused to feed said end away from the path of the advancing end of the next succeeding card, a receiving-receptacle, and a follower within said receptacle, substantially as described.

25. In combination, a pair of rolls, a pusher acting on a card discharging from said rolls to press said card out of the path of the next succeeding one, a cam to retract said pusher positively after it has acted on a card, and a spring to actuate said pusher to advance the card, substantially as described.

26. In combination, the printing and backing rolls, one thereof having one or more grooves extending circumferentially thereof, and the receiving-receptacle one side thereof having a tongue or tongues entering the groove or grooves in the roll, substantially as described.

27. In combination, a receiver for a stack of cards or the like, a feeder and means for operating the same, a follower acting in connection with said stack, a feeler moving in unison with the said follower and movable relatively thereto, and stop-motion devices under operative control of said feeler and brought into action when the last card or the like in the stack has been fed forward, substantially as described.

28. In combination, a receiver for a stack of cards or the like, a feeder and means for operating the same, a follower acting in connection with said stack, a feeler traveling in unison with said follower and movable relatively thereto, a latch held under restraint by the said feeler until the last card is fed, stop-motion devices under the operative control of said latch, substantially as described.

29. In combination, a receiver for a stack of cards or the like, a feeder and means for operating the same, the follower, the movable feeler traveling in unison with the follower and having the inclined portion, the latch engaging with the incline of the feeler, the movable support for said latch carried by said follower, the rocker coacting with the said movable support, and stop-motion connections for said rocker, substantially as described.

30. In combination, the printing-roll, the backing-roll coöperating therewith, means to feed cards to the said rolls, the gage coöperating with said backing-roll and having a shank, the swinging rocker having the hollow stem receiving the shank of the gage, the spring acting to press the gage toward the backing-roll, and means to adjust the approach of the gage to the said backing-roll, substantially as described.

31. In combination, the backing-roll, the gage coöperating with said backing-roll and having a shank, the swinging rocker having the hollow stem receiving the said shank, the spring acting to press the gage toward the backing-roll, means to adjust the approach of the gage to the said roll, a shipper, and a latch therefor operated by the said rocker, to release the said shipper, substantially as described.

32. In combination, a backing-roll, a gage coöperating with said backing-roll and having a shank, a swinging rocker having a hollow stem receiving the said shank, a spring acting to advance the said gage into proximity to the backing-roll, means to adjust the approach of the gage to the backing-roll, a shipper, a signaling device, and latching means for said shipper and signaling device operated by the said rocker, substantially as described.

33. In combination, the backing-roll, the gage coöperating with said backing-roll and having a shank, a swinging rocker having a hollow stem receiving the said shank, the spring acting to press the gage toward the backing-roll, means to adjust the approach of the gage to the said roll, a shipper-handle, a spring-actuated device for operating the said handle in loose connection therewith to permit independent movement of the said handle by hand when desired, and a latch for said device operated by the said rocker, substantially as described.

34. In combination, the backing-roll, the rocker provided with the gage coöperating with the said backing-roll, the shipper-handle, the spring-actuated device for operating said handle, the slotted link connecting the said handle with the said device, and the latch under control of the said rocker, substantially as described.

35. In combination, means for feeding cards successively, the backing-roll, the excess-feed gage between which and the said surface the cards pass, and its screw-threaded stem, the rocker by which the gage is carried, and its socket, the spring within said socket, and the nut engaging with said stem to enable the gage to be adjusted, substantially as described.

36. In combination, the marking and backing rolls, means to feed cards or the like successively thereto, a misfeed-detector, a detent operatively connected with said detector, a rocker with which said detent coöperates, a cam for moving said rocker in one direction and a spring for moving it in the other direction, and a signaling device under operative control of said rocker, substantially as described.

37. In combination, the marking and backing rolls, means to feed cards or the like successively thereto, a misfeed-detector, a detent operatively connected with said detector, a rocker with which said detent coöperates, a cam for moving said rocker in one direction and a spring for moving it in the other direction, and stop-motion mechanism under operative control of said rocker, substantially as described.

38. In combination, the marking and backing rolls, means to feed cards or the like successively thereto, a misfeed-detector, a detent operatively connected with said detector, a rocker with which said detent coöperates, a cam for moving said rocker in one direction and a spring for moving it in the other direction, and signaling and stop-motion mechanism under operative control of said rocker, substantially as described.

39. In combination, the marking and backing rolls, means to feed cards or the like successively thereto, the misfeed-detector, the detent operatively connected with said detector, a rocker with which said detent coöperates, the cam for moving said rocker in one direction and a spring for moving it in the other direction, and the latch operated from the said rocker, substantially as described.

40. In combination, means for marking and backing cards or the like, means for feeding cards or the like successively thereto, driving mechanism for the machine, a detector to detect failure of said feeding means to deliver a card to said marking means, and power-unshipping and dead-stop devices under operative control of the said detector, substantially as described.

41. In combination, means for marking or printing cards or the like, means for feeding cards or the like to the said marking or printing means, detector devices operated by a card in its travel through the machine, and a signal made operative under control of said detector devices by failure of a card to pass the detecting-point in the machine at a predetermined time after having entered into operative relations with said detector devices, substantially as described.

42. In combination, means for marking or printing cards or the like, means for feeding cards or the like to the said marking or printing means, detector devices operated by a card in its travel through the machine, and stop-motion mechanism made operative under control of said detector devices by failure of a card to pass the detecting-point in the machine at a predetermined time after having entered into operative relations with said detector devices, substantially as described.

43. In combination, means for marking or printing cards or the like, means for feeding cards or the like to the said marking or printing means, detector devices operated by a card in its travel through the machine, and signaling and stop-motion devices made operative under control of said detector devices by failure of a card to pass the detecting-point in the machine at a predetermined time after having entered into operative relations with said detector devices, substantially as described.

44. In combination, means for marking or printing cards or the like, means for feeding cards or the like to the said marking or printing means, detecting means controlled by the cards which are fed by the said feeding means, a signal, means whereby said signal is caused to act on failure of the feeding means to supply a card, and means whereby said signal is caused to act in case a card which has been fed fails to complete its required movement by a predetermined time, substantially as described.

45. In combination, means for marking or printing cards or the like, means for feeding cards or the like to the said marking or printing means, detecting means controlled by the cards which are fed by the said feeding means, stopping devices, means whereby said stopping devices are caused to act on failure of the feeding means to supply a card, and means whereby said stopping devices are caused to act in case a card which has been fed fails to complete its required movement by a predetermined time, substantially as described.

46. In combination, means for marking or printing cards or the like, means for feeding cards or the like to the said marking or printing means, detecting means controlled by the cards which are fed by the said feeding means, signaling and stopping devices, means whereby said devices are caused to act on failure of the feeding means to supply a card, and means whereby said devices are caused to act in case a card which has been fed fails to complete its required movement by a predetermined time, substantially as described.

47. In combination, the marking and backing rolls, and a full-feed detector acting against a card or the like while supported by one of the said rolls, to ascertain failure of the same to pass the said rolls, substantially as described.

48. In combination, the marking and backing rolls, a full-feed detector to ascertain failure of a card or other article to complete its travel, stop-motion mechanism, a latch therefor, and means under the control of said detector to operate said latch, subtantially as described.

49. In combination, the marking and backing rolls, a full-feed detector to ascertain failure of a card or other article to complete its travel, a signaling device, a latch therefor, and means under the control of said detector to operate said latch, substantially as described.

50. In combination, the marking and backing rolls, a full-feed detector to ascertain failure of a card or other article to complete its travel, signaling and stop-motion mechanism, latching means therefor, and means under the control of said detector to operate said latching means, substantially as described.

51. In combination, marking or printing devices, a detector controlled as to its position by a card or the like in transit, a movable member provided with a dog, means to vibrate the said member, a signal operated through the agency of said member, a latch operatively controlled by said detector and itself adapted to control the movement of said member, and a moving actuating-dog to engage the aforesaid dog when the latter is caused by the said latch to remain in the path of movement of the actuating-dog, substantially as described.

52. In combination, marking or printing devices, a detector controlled as to its position by a card or the like in transit, a movable member provided with a dog, stop-motion devices operated through the agency of said member, a latch operatively controlled by said detector and itself adapted to control the movement of said member, and a moving actuating-dog to engage the aforesaid dog when the latter is caused by the said latch to remain in the path of movement of the actuating-dog, substantially as described.

53. In combination, marking or printing devices, a detector controlled as to its position by a card or the like in transit, a moving actuating-dog, tripping devices adapted to be actuated by the said dog, a signal under control of said tripping devices, means for actuating said tripping devices and thereby causing a second dog pertaining thereto to be carried into and out of the working range of said actuating-dog, and a controller for said tripping devices in connection with said detector whereby said second dog is caused to become engaged by said actuating-dog when the card or the like fails to completely pass the detector, substantially as described.

54. In combination, marking or printing devices, a detector controlled as to its position by a card or the like in transit, a moving actuating-dog, tripping devices adapted to be actuated by the said dog, stop-motion devices under control of said tripping devices, means for actuating said tripping devices and thereby causing a second dog pertaining thereto to be carried into and out of the working range of said actuating-dog, and a controller for said tripping devices in connection with said detector whereby said second dog is caused to become engaged by said actuating-dog when the card or the like fails to completely pass the detector, substantially as described.

55. In combination, marking or printing devices, a detector controlled as to its position by a card or the like in transit, a moving actuating-dog, tripping devices adapted to be actuated by the said dog, stop-motion and signaling devices under control of said tripping devices, means for actuating said tripping devices and thereby causing a second dog pertaining thereto to be carried into and out of the working range of said actuating-dog, and a controller for said tripping devices in connection with said detector whereby said second dog is caused to become engaged by said actuating-dog when the card or the like fails to completely pass the detector, substantially as described.

56. In combination, the printing and backing rolls, a detector controlled as to its position by a card or the like in transit, an actuating-dog moving in unison with the printing-roll, a rocker carrying a second dog for coöperation with said actuating-dog, means to move said rocker to carry said second dog into and out of the working range of said actuating-dog, and a latch under operative control of said detector and itself controlling the action of said rocker, substantially as described.

In testimony whereof I affix my signature in presence of two witnesses.

JOSEPH FRENCH.

Witnesses:
   CHAS. F. RANDALL,
   WILLIAM A. COPELAND.